United States Patent
Tabata et al.

[11] Patent Number: 5,833,570
[45] Date of Patent: Nov. 10, 1998

[54] VEHICLE TRANSMISSION SHIFT CONTROL APPARATUS WHEREIN TORQUE OF MOTOR CONNECTED TO AUTOMATIC TRANSMISSION IS CONTROLLED TO REDUCE SHIFTING SHOCK OF TRANSMISSION

[75] Inventors: Atsushi Tabata, Okazaki; Yutaka Taga, Aichi-gun; Ryuji Ibaraki, Toyota; Hiroshi Hata, Toyota; Tsuyoshi Mikami, Toyota, all of Japan

[73] Assignee: Toyota Jidosha Kabushiki Kaisha, Toyota, Japan

[21] Appl. No.: 863,336

[22] Filed: May 27, 1997

[30]       Foreign Application Priority Data

May 28, 1996 [JP] Japan .................................. 8-133121

[51] Int. Cl.$^6$ ................................................. B60L 11/14
[52] U.S. Cl. ................................................................ 477/3
[58] Field of Search ...................................................... 477/3

[56]                   References Cited
              U.S. PATENT DOCUMENTS 5,285,111   2/1994  Sherman ..................................... 477/3
5,562,565  10/1996  Moroto et al. ............................. 477/3

FOREIGN PATENT DOCUMENTS

A-63-212137  9/1988  Japan .
A-3-37470    2/1991  Japan .
A-7-67208    3/1995  Japan .

Primary Examiner—Dirk Wright
Attorney, Agent, or Firm—Oliff & Berridge, PLC

[57]               ABSTRACT

A shift control apparatus for controlling a variable-speed ratio automatic transmission of a motor vehicle having an engine, and a motor/generator which function as a vehicle driving electric motor and/or an electric generator, the automatic transmission being operatively connected to a drive wheel and an assembly of the engine and the motor/generator, the shift control apparatus including a target determining device for determining a pattern of change of a target value of the rotating speed of a rotary member of the automatic transmission or a target value of the output torque of the automatic transmission, during a shifting action thereof, and a motor torque feedback control device for feedback controlling a torque of the motor/generator during the shifting action of the automatic transmission such that the rotating speed of the rotary member or the output torque changes according to the pattern of change of the target value.

17 Claims, 20 Drawing Sheets

FIG. 3

| SHIFT LEVER | TRANSMISSION | CLUTCHES | | | BRAKES | | | | | ONE-WAY CLUTCHES | | | SPEED RATIO |
|---|---|---|---|---|---|---|---|---|---|---|---|---|---|
| | | $C_0$ | $C_1$ | $C_2$ | $B_0$ | $B_1$ | $B_2$ | $B_3$ | $B_4$ | $F_0$ | $F_1$ | $F_2$ | |
| NEUTRAL | N | ○ | | | | | | | | | | | — |
| REVERSE | Rev | ○ | | ○ | | | | | | | | | −4.550 |
| DRIVE | 1st | ○ | ○ | | | | | | ○ | ○ | | | 3.357 |
| DRIVE | 2nd | ● | ○ | | | | | | ● | ○ | | ○ | 2.180 |
| DRIVE | 3rd | ○ | ○ | | | ● | | ○ | | ○ | | | 1.424 |
| DRIVE | 4th | ○ | ○ | ○ | | | ○ | | | ○ | ○ | | 1.000 |
| DRIVE | 5th | | ○ | ○ | ○ | | ○ | | | | | | 0.753 |

FIG. 8

| MODE | CLUTCHES | | ENGINE 12 | STORAGE DEVICE 58 | MODE NOMENCLATURE |
|---|---|---|---|---|---|
| | CE1 | CE2 | | | |
| 1 | OFF | ON | OFF | DISCHARGED | MOTOR DRIVE |
| 2 | ON | ON | ON | NO ENG. CSMD | ENGINE DRIVE |
| 3 | ON | ON | ON | CHARGED | ENGINE DRIVE + CHARGING |
| 4 | ON | ON | ON | DISCHARGED | ENGINE · MOTOR DRIVE |
| 5 | ON | OFF | OFF | CHARGED | VEHICLE START BY ENGINE |
| 6 | OFF | ON | ON | CHARGED | REGENERATIVE BRAKING |
| 7 | ON | OFF | OFF | NO ENG. CSMD | ELECTRIC NEUTRALITY |
| 8 | ON | ON | OFF | NO ENG. CSMD | ENGINE BRAKING |
| 9 | ON | ON | START | DISCHARGED | ENGINE STARTING |

FIG. 21

| SHIFT LEVER | TRANSMISSION | CLUTCHES | | BRAKES | | | | ONE-WAY CLUTCHES | | SPEED RATIO |
|---|---|---|---|---|---|---|---|---|---|---|
| | | $C_1$ | $C_2$ | $B_1$ | $B_2$ | $B_3$ | $B_4$ | $F_1$ | $F_2$ | |
| NEUTRAL | N | | | | | | | | | — |
| REVERSE | Rev | | ○ | | | | ○ | | | −4.550 |
| DRIVE | 1st | ○ | | | | | ● | | ○ | 3.357 |
| | 2nd | ○ | | | | ○ | | | | 2.180 |
| | 3rd | ○ | | ● | ○ | | | ○ | | 1.424 |
| | 4th | ○ | ○ | | ○ | | | | | 1.000 |

VEHICLE TRANSMISSION SHIFT CONTROL APPARATUS WHEREIN TORQUE OF MOTOR CONNECTED TO AUTOMATIC TRANSMISSION IS CONTROLLED TO REDUCE SHIFTING SHOCK OF TRANSMISSION

BACKGROUND OF THE INVENTION

1. Field of the Invention

The present invention relates in general to a shift control apparatus for controlling an automatic transmission of a motor vehicle, and more particularly to techniques for reducing a shifting shock of the automatic transmission.

2. Discussion of the Related Art

There is known a hybrid motor vehicle which uses an engine operated by combustion of a fuel and an electric motor, as a drive power source, and includes an automatic transmission which is disposed between the drive power source and drive wheels of the vehicle and whose speed ratio is variable. At least one of the engine and the electric motor is operated to drive the vehicle in a selected one of a plurality of running modes. An example of such a hybrid motor vehicle is disclosed in JP-A-7-67208. The running modes include an engine drive mode in which only the engine is operated as the drive power source, a motor drive mode in which only the electric motor is operated as the drive power source, and an engine-motor drive mode in which both the engine and the electric motor are operated as the drive power source.

As the automatic transmission of such a hybrid motor vehicle, there has been widely used an automatic transmission of a planetary gear type or other type having a plurality of gear positions (speed positions) which are selectively established by selective engagement or disengagement of suitable coupling means such as clutches and brakes. In an ordinary motor vehicle having only an engine as the drive power source and equipped with an automatic transmission, a shift control apparatus is provided for controlling the automatic transmission. For reducing the shifting shock of the automatic transmission, the shift control apparatus is adapted to feedback control a force of engagement of the coupling means, which is determined by a transient hydraulic pressure applied to a hydraulically operated frictional coupling device, for example, during a shifting action of the automatic transmission). That is, the transient hydraulic pressure controlled so that the, rotating speed of a given rotary member of the automatic transmission changes according to a predetermined pattern, so as to reduce the shifting shock of the automatic transmission. Examples of such a shift control apparatus are disclosed in JP-A-63-212137 and JP-A-3-37470.

However, the feedback control of the force of encagement of the coupling means is influenced by the temperature and variations of individual actuators for the coupling means, and cannot necessarily be effected with high accuracy, leaving a possibility of some shifting shock of the automatic transmission. Where the automatic transmission is a continuously variable transmission whose speed ratio is continuously varied by a hydraulic actuator, the same problem as described above is encountered.

SUMMARY OF THE INVENTION

It is therefore an object of the present invention to provide a shift control apparatus which permits improved accuracy of control of an automatic transmission of a motor vehicle so as to reduce the shifting shock.

The above object may be achieved according to the principle of the present invention which provides a shift control apparatus for controlling an automatic transmission of a motor vehicle having a drive wheel, an engine operated by combustion of a fuel, and a motor/generator which function as at least one of an electric motor for driving the drive wheel and an electric generator, the automatic transmission having a variable speed ratio and being operatively connected to the drive wheel and an assembly of the engine and the motor/generator, the shift control apparatus comprising: (a) target determining means for determining a pattern of change of a target value of a selected operating parameter of the automatic transmission during a shifting action thereof; and (b) motor torque feedback control means for feedback controlling a torque of the motor/generator during the shifting action of the automatic transmission such that the selected operating parameter changes according to the pattern of change of the target value.

In one preferred form of this invention, the target determining means is adapted to determine, as the selected operating parameter, a pattern of change of a target value of a rotating speed of a rotary member of the automatic transmission, and the motor torque feedback control means is adapted to control the torque of the motor/generator such that the rotating speed of the rotary member changes according to the pattern of change of the target value of the rotating speed of the rotary member.

In another preferred form of this invention, the target determining means is adapted to determine a pattern of change of a target value of an output torque of the automatic transmission, and the motor torque feedback control means is adapted to control the torque of the motor/generator such that the output torque of the automatic transmission changes according to the pattern of change of the output torque of the automatic transmission.

In the present shift control apparatus, the torque of the motor/generator is controlled so that the rotating speed of the selected rotary member of the automatic transmission or the output torque of the automatic transmission changes according to the determined pattern of change of its target value, namely, so that the rotating speed or output torque coincides with the target value which is determined from time to time. Since the torque of the motor/generator can be controlled with high accuracy and response, the shifting action of the automatic transmission can be controlled with higher accuracy so as to reduce the shifting shock with higher stability, than in the conventional apparatus wherein the hydraulic pressure applied to the appropriate coupling means for achieving the shifting action is controlled.

Where the torque of the motor/generator is controlled such that the output torque of the automatic transmission changes according to the determined pattern of change of its target value, the shifting action can be controlled with improved accuracy and stability, since the output torque of the automatic transmission directly relates to the shifting shock of the automatic transmission and a load of the power transmitting system.

The automatic transmission whose shifting action is controlled by the present shift control apparatus is disposed between and operatively connected to the drive wheel of the motor vehicle and the assembly of the engine and the motor/generator, so that the vehicle is driven by the engine and/or the motor/generator. The motor vehicle may be a hybrid drive vehicle wherein at least one of the engine and the motor/generator is operated as the drive power source for driving the motor vehicle in a selected one of different drive modes. In this hybrid drive vehicle, the motor/generator can be operated as an electric motor for driving the vehicle. However, the principle of the present invention is equally applicable to an automatic transmission of an ordinary engine vehicle wherein the motor/generator is used only as an electric generator operatively connected to the drive wheel and the automatic transmission. Further, the present invention is applicable to a hybrid drive vehicle equipped with at least one electric motor for driving the vehicle, as well as the engine and the motor/generator. Such an electric motor may be provided for each of drive wheels of the vehicle. The hybrid drive vehicle may use clutch means which is selectively engaged and released to connect and disconnect power transmitting paths for selectively use the engine and/or the motor/generator. Alternatively, the hybrid drive vehicle may include a planetary gear device or other synthesizing/distributing mechanism for synthesizing or distributing outputs of the engine and motor/generator.

The shift control apparatus of the present invention is particularly suitable for controlling shifting actions of the automatic transmission having two or more operating positions having different speed ratios, which are selectively established by selective engagement or disengagement of suitable coupling means whose engagement force is controllable. The coupling means may be hydraulically operated frictional coupling devices such as clutches or brakes operated by suitable hydraulic actuators. However, the present shift control apparatus is also applicable to a continuously variable transmission of belt-and-pulley type or toroidal type whose speed ratio is continuously variable by a suitable hydraulic actuator device.

As described above, the motor torque control means is preferably adapted to feedback control the torque of the motor/generator such that the rotating speed of a rotary member of the automatic transmission or the output torque of the automatic transmission coincides with the target value which changes according to a predetermined pattern. Where the vehicle is driven with the motor/generator operated as the drive power source (as a vehicle driving electric motor), the torque of the motor/generator is controlled (increased or decreased) depending upon the amount of error or difference of the rotating speed of the rotary member or the output torque from the target value. Where the vehicle is driven with only the engine operated as the drive power source, the motor/generator is placed in a non-load state in which the motor/generator is freely rotatable. In this case, the motor/generator is given reverse rotation torque or regenerative braking torque, depending upon the amount of error indicated above. Where the motor/generator is used as the electric generator for generating an electric energy by regenerative braking, the regenerative braking torque of the electric generator is controlled depending upon the amount of error indicated above.

The the actual value of the selected operating parameter (speed of the selected rotary member or output torque) of the automatic transmission may be delayed with respect to the determined pattern of change of the target value. That is, the actual value may be larger than the target value when the target value is decreasing, or may be smaller than the target value when the target value is increasing. In this case, the shifting action of the automatic transmission is taking place at a rate lower than the optimum value, and therefore the torque of the motor/generator is controlled so as to reduce the input torque of the automatic transmission. Alternatively, the torque of the motor/generator is controlled so as to increase the input torque of the automatic transmission, if the shifting action is taking place at a rate higher than the optimum value, namely, if the actual value of the rotating speed or output torque of the automatic transmission is smaller than the target value when the target value is decreasing, or larger than the target value when the target value is increasing.

Where the automatic transmission has a plurality of operating positions having respective different speed ratios selectively established by selective engaging and releasing actions of suitable coupling means, the shift control apparatus may further comprise initial state control means for controlling an initial operating characteristic of the coupling means during an initial portion of the shifting action of the automatic transmission, as a result of feedback control of the torque of the motor/generator by the motor torque feedback control means. The initial operating characteristic of the coupling means may be an initial force of engagement of the coupling means during an initial period of the engaging or releasing action of the coupling means during the initial portion of the shifting action. This arrangement is effective to reduce the required amount of feedback control or compensation of the torque of the motor/generator, which is generally initiated after the input speed or output torque of the automatic transmission has changed after the initiation of the shifting action.

Generally, the force of engagement of the coupling means in the initial portion of the shifting action is basically determined on the basis of the particular running condition of the vehicle such as the kind of the shifting action and the input torque of the transmission (which may be represented by the operating amount of the accelerator pedal, for example). However, the initial force of engagement of the coupling means which is engaged to achieve the shifting action may vary due to various fluctuating factors of the automatic transmission. When the initial force of engagement is smaller than an optimum value, the torque of the motor/generator is feedback controlled so as to reduce the input torque of the automatic transmission. The manner in which the torque of the motor/generator is changed by the feedback control depends upon the amount of deviation of the initial force of engagement of the coupling means from the optimum value. If the initial force of engagement is abnormally smaller than the optimum value, the feedback compensation of the torque of the motor/generator must be effected by a relatively large amount and for a relatively long time. Therefore, the manner of feedback control of the torque of the motor/generator during one occurrence of a shifting action of the automatic transmission may be utilized in determining the optimum initial characteristic (initial force of engagement) of the coupling means in the next or following occurrences of the same shifting action of the transmission, so that the engaging or releasing action of the coupling means is initiated in the next occurrence of the shifting action, with the thus determined initial characteristic, whereby the error or difference of the torque of the motor/generator from the optimum value upon initiation of the feedback control is accordingly reduced. In other words, the initial state control means makes it possible to reduce the error of the actual speed of the rotary member or the output torque of the automatic transmission from the target value, upon initiation of the feedback control, and therefore reduce the required amount of feedback control of the torque of the motor/generator by the motor torque feedback control means.

The initial state control means is preferably adapted to control an initial engaging force of the coupling means in an initial period of an engaging or releasing action thereof during the initial portion of portion of the shifting action.

The coupling means may be a hydraulically operated clutch or brake. Where the shifting action of the automatic transmission is a so-called "clutch-to-clutch" shifting action which is achieved by releasing one coupling device while engaging another coupling device, the initial state control means may be adapted to control the point of time at which the engagement or releasing of the coupling device is initiated.

The shift control apparatus may further data map memory means for storing a data map representative of a predetermined relationship between the initial operating characteristic of the coupling means and a running condition of the motor vehicle. In this case, the initial state control means is preferably adapted to determine the initial operating characteristic of the coupling means on the basis of the running condition of the motor vehicle and according to the predetermined relationship, and to update the data map as a result of the feedback control of the torque of the motor/generator by the motor torque feedback control means. The running condition of the vehicle may include not only the input torque of the automatic transmission and the kind of the shifting action of the automatic transmission, but also the currently selected one of a plurality of different drive modes. Where the motor vehicle is a hybrid drive vehicle, the drive modes include an engine drive mode in which only the engine is operated as the drive power source, a motor drive mode in which only the motor/generator is operated as the drive power source, and an engine and motor drive mode which both the engine and the motor/generator are operated as the drive power source. The initial state control means may be adapted to control the initial characteristic of the coupling means in different manners corresponding to the different drive modes. Further, the memory means may store two or mode data maps corresponding to the respective different drive modes.

The shift control apparatus may further comprise speed detecting means for detecting an actual value of the rotating speed of the rotary member which changes during the shifting action of the automatic transmission, or torque detecting means for detecting the output torque of the automatic transmission. In this case, the motor torque feedback control means feedback is adapted to control the torque of the motor/generator such that the actual value of the rotary speed of the rotary member detected by the speed detecting means or the actual value of the output torque of the automatic transmission detected by the torque detecting means coincides with the target value which is determined from time to time by the target determining means. The pattern of change of the target value of the output torque may be determined by calculating the output torque values before and after the shifting action on the basis of the difference of the speed ratios of the automatic transmission before and after the shifting action, so that the output torque of the automatic transmission is smoothly changed from the initial output torque upon initiation of the shifting action to the terminal output torque upon completion of the shifting action.

The torque of the motor/generator may be controlled in a feed-forward fashion according to a data map representative of a predetermined relationship between the torque of the motor/generator and the rotating speed of the rotary member of the automatic transmission or the output torque of the automatic transmission, so that the actual rotating speed or output torque changes according to a desired pattern. Where the torque of the motor/generator is controlled such that the output torque of the automatic transmission changes according to the determined pattern of change of the target value, the amount of change of the torque of the motor/generator by the motor torque feedback control means is generally large. In this case, it is desirable to effect the feed-forward control of the torque of the motor/generator depending upon the input torque (preferably, inertia torque) of the automatic transmission (which may be represented by the operating amount of the accelerator pedal of the vehicle), or the kind of the shifting action of the automatic transmission.

The shift control apparatus may further comprise engine control means for feedback controlling a torque of the engine during the shifting action of the automatic transmission such that the rotating speed of a selected rotary member of the automatic transmission changes according to a predetermined pattern of change of a target value of the rotating speed. Alternatively, the shift control apparatus may further comprise engine control means for feedback controlling the torque of the engine during the shifting action of the automatic transmission such that the output torque of the automatic transmission changes according to a predetermined pattern of change of a target value of the output torque. This arrangement makes it possible to suitably control the shifting action of the automatic transmission even when the motor/generator cannot be normally operated due to some electric failure or insufficiency of an electric energy stored in an electric energy storage device for operating the motor/generator. The torque of the engine may also be preferably controlled in a feed-forward fashion, as described above with respect to the torque of the motor/generator.

Where the motor vehicle is a hybrid drive vehicle having a plurality of drive modes, it is preferable to inhibit a change of the drive mode, that is, inhibit a change of the drive power source from the engine to the motor/generator or vice versa, while the torque of the motor/generator or engine is controlled by the motor torque control means or the engine control means.

The feedback control of the motor/generator by the motor torque control means need not be effected to all shifting actions of the automatic transmission. Usually, the automatic transmission tends to suffer a relatively large shifting shock during a so-called "clutch-to-clutch" shifting action explained above, or a shift-up action from one of the operating positions to another operating position whose speed ratio is lower than that of the above-indicated one operating position. The speed ratio is defined as a ratio of the input speed to the output speed of the automatic transmission. Where the torque of the motor/generator is controlled such that the rotating speed of the rotary member of the automatic transmission coincides with the target value, the input shaft of the automatic transmission is preferably used as this rotary member, since the speed of the input shaft changes during any one of the shifting actions of the automatic transmission. However, the rotating speed of one of different rotary members may be used as the selected operating parameter of the automatic transmission, depending upon the specific shifting action.

BRIEF DESCRIPTION OF THE DRAWINGS

The above and other objects, features, advantages and technical and industrial significance of this invention will be better understood by reading the following detailed description of presently preferred embodiments of the invention, when considered in connection with the accompanying drawings, in which:

FIG. 3 is a view indicating operating states of various coupling elements for establishing different operating positions of an automatic transmission in the hybrid drive system of FIG. 1;

FIG. 8 is a view indicating nine operating modes which are selectively established in the sub-routine of FIG. 7;

FIG. 21 is a view indicating the operating states of coupling elements for establishing different operating positions of an automatic transmission in the hybrid drive system of FIG. 20.

DETAILED DESCRIPTION OF THE PREFERRED EMBODIMENTS

Figure 1:
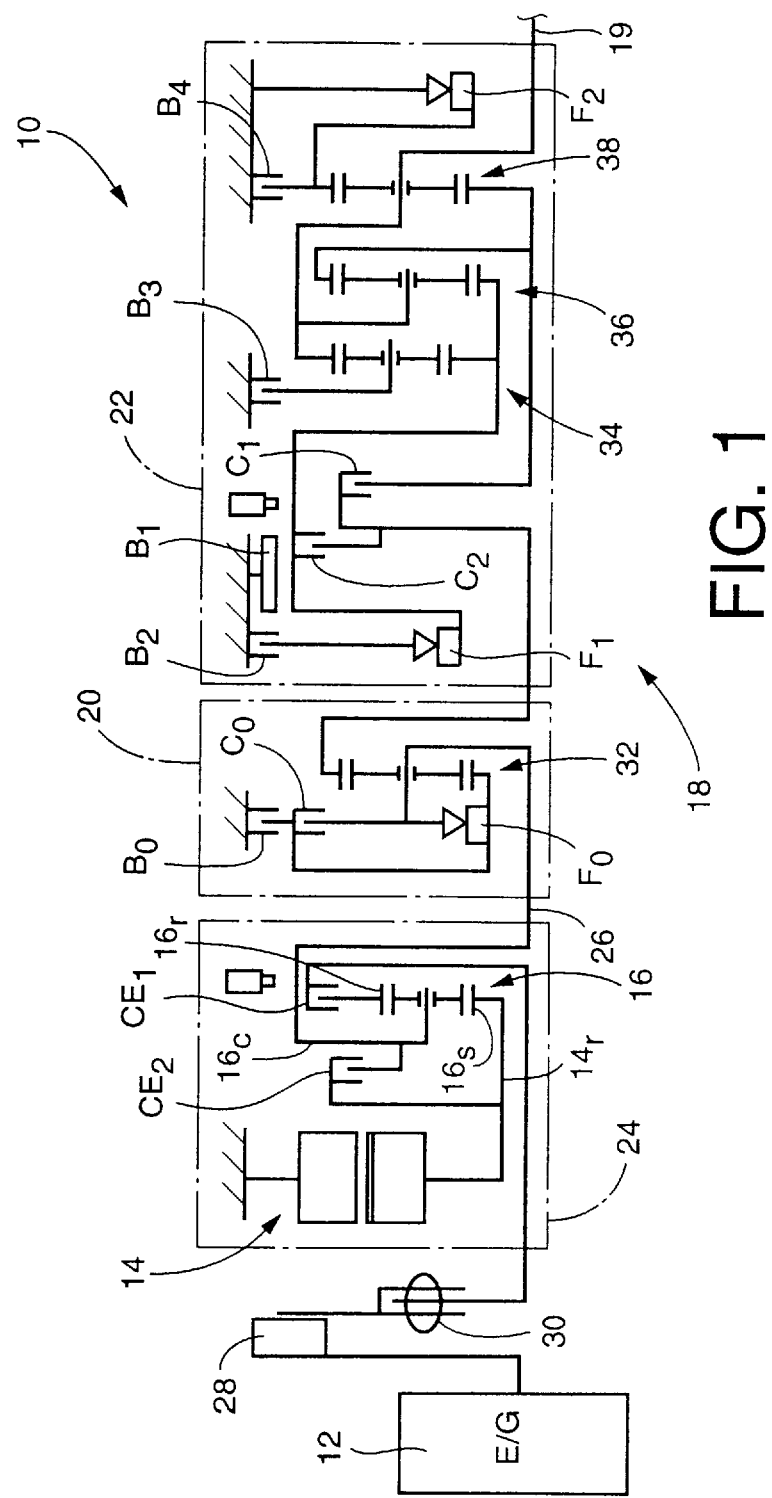
FIG. 1 is a schematic view illustrating a general arrangement of a hybrid drive system of a hybrid motor vehicle equipped with a transmission shift control apparatus constructed according to a first embodiment of the present invention.

Referring first to the schematic view of FIG. 1, there is shown a hybrid drive system 10 adapted for use on a front-engine rear-drive motor vehicle (FR vehicle). The hybrid drive system 10 includes: an engine 12 such as an internal combustion engine, which is operated by combustion of a fuel; a motor/generator 14 which functions as an electric motor operated with an electric energy, and an electric generator; a planetary gear device 16 of single pinion type; and an automatic transmission 18 which is controlled by a shift control apparatus constructed according to one embodiment of this invention, as described below in detail. These engine 12, motor/generator 14, planetary gear device 16 and automatic transmission 18 are arranged in the longitudinal direction of the motor vehicle. The automatic transmission 18 has an output shaft 19 which is operatively connected to rear right and left drive wheels of the vehicle through a propeller shaft and a differential gear device (which are not shown), to transmit a drive force to the drive wheels.

The planetary gear device 16 functions as a synthesizing/distributing mechanism for mechanically synthesizing and distributing forces, and cooperates with the motor/generator 14 to constitute an electrically controlled torque converter 24 as indicated in one-dot chain line in FIG. 1. The planetary gear device 16 includes: a first rotary element in the form of a ring gear 16r connected to the engine 12 through a first clutch CE1; a second rotary element in the form of a sun gear 16s connected to a rotor shaft 14r of the motor/generator 14; and a third rotary element in the form of carrier 16c connected to an output shaft, which is an input shaft 26 of the automatic transmission 18. The sun gear 16s and carrier 16c are connected to each other through a second clutch CE2.

The engine 12 is connected to the first clutch CE1 through a flywheel 28 and a damper 30. The flywheel 28 and the damper 30 function to absorb speed and torque variations of the engine 12. The damper 30 includes an elastic member such as a spring or a rubber member. The first and second clutches CE1, CE2 are friction type multiple-disk clutches which are engaged and released by respective hydraulic actuators.

The automatic transmission 18 is a combination of a front auxiliary transmission 20 and a rear primary transmission 22. The auxiliary transmission 20 consists of an overdrive planetary gear set 32 of single pinion type, while the primary transmission 22 consists of three planetary gear sets 34, 36, 38 connected to each other. The primary transmission 22 has five forward-drive positions and one rear-drive position. The auxiliary transmission 20 includes frictionally coupling clutch C0 and brake B0 operated by respective hydraulic actuators, and a one-way clutch F0.

The primary transmission 22 frictionally coupling clutches C1, C2 and brakes B1, B2, B3, B4 which are operated by respective hydraulic actuators, and one-way clutches F1, F2. The automatic transmission 18 includes a hydraulic control device 44 incorporating solenoid-operated valves SL1–SL4 shown in FIG. 2. The solenoids of these solenoid-operated valves SL1–SL4 are selectively energized and deenergized to selectively engage and release the clutches C0, C1, C2 and brakes B0, B1, B2, B3, B4 for selectively establishing one of operating positions of the automatic transmission 18, as indicated in FIG. 3. The operating positions of the automatic transmission 18 consist of a neutral position "N", a rear-drive position "Rev", and five forward-drive positions, that is, first-speed position "1st", second-speed position "2nd", third-speed position "3rd", fourth-speed position "4th" and fifth-speed position "5th", as indicated in FIG. 3. The hydraulic control device 44 includes a manual shift valve which is mechanically connected to and operated by a shift lever. The clutches C0–C2 and brakes B0–B4 are controlled by the solenoid-operated valves SL1–SL4 and the manual shift valve. The shift lever has a parking position "P", a neutral position "N", a reverse position "R", a drive position "D", and engine braking positions such as a third-speed position "3", a second speed position "2" and a low-speed position "L".

Since the automatic transmission 18 and the electrically controlled torque converter 24 are symmetrical with respect to their centerline, only the upper halves of the transmission 28 and torque converter 24 are shown in FIG. 1.

In the table of FIG. 3, white circles indicate the engaged states of the clutches C, brakes B and one-way clutches F, while black circles indicate the engaged states of the clutch C0 and brakes B1, B4 when the shift lever is shifted to any one of the above-indicated engine braking positions. The absence of the white or black circles indicates the released states of the clutches C, brakes B and one-way clutches F.

The neutral and rear-drive positions "N", "Rev" of the automatic transmission 18 are established by the manual shift valve mechanically connected to the shift lever. When the shift lever is placed in any one of the engine braking positions, the transmission 18 is automatically shifted by the manual shift valve. When the shift lever 240 is placed in the drive position "D", the automatic transmission 18 is automatically placed in an appropriate one of the five forward-drive positions "1st" through "5th", with the solenoids of the solenoid-operated valves SL1–SL4 being selectively energized depending upon the running condition of the vehicle.

The speed ratios of the five forward-drive positions of the automatic transmission 18 decrease in steps from the speed ratio of the first-speed position "1st" to the speed ratio of the fifth-speed position "5th", as indicated in FIG. 3, by way of example only. The fourth-speed position "4th" has a speed ratio $i_4$ which is equal to 1.

Figure 4:
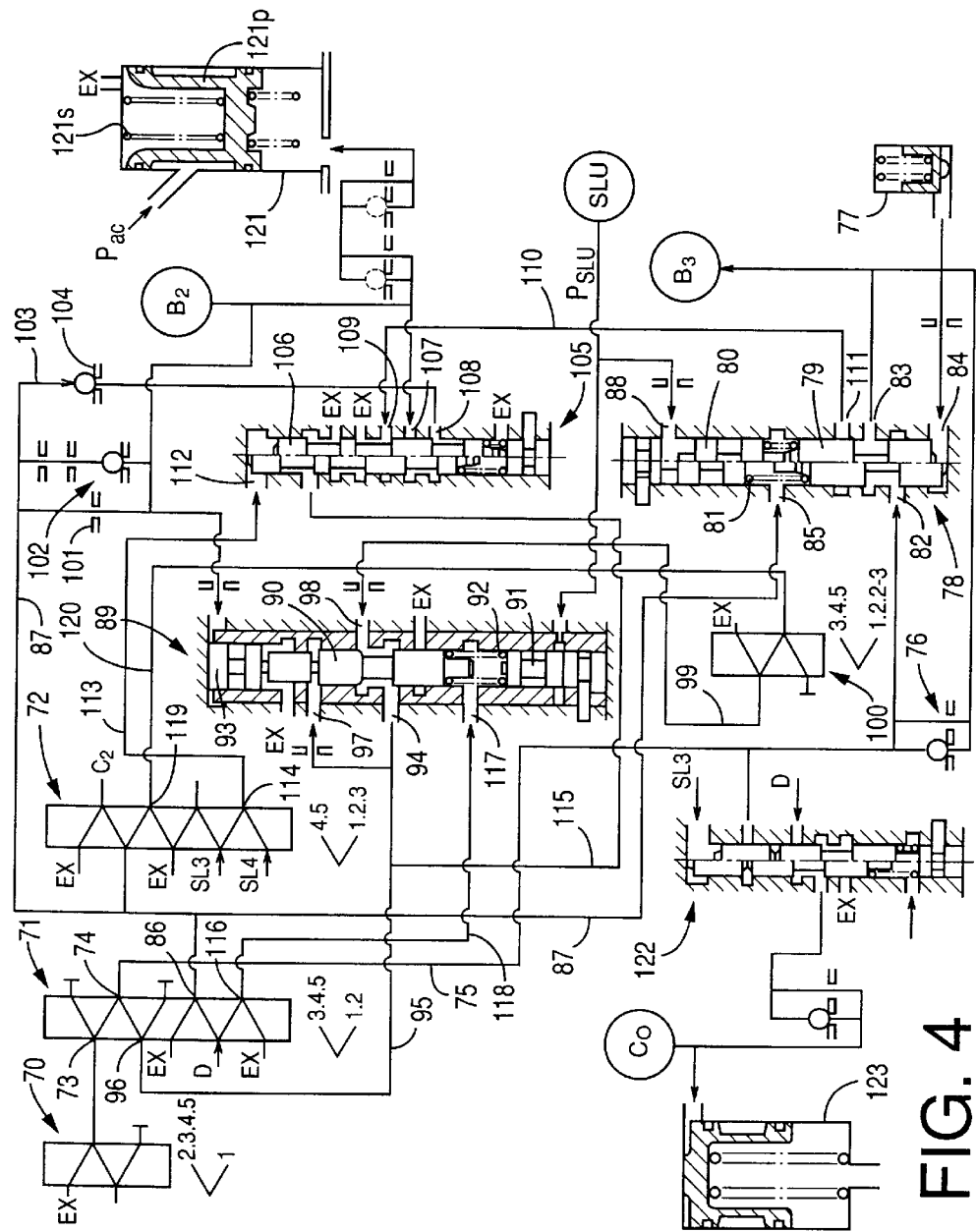
FIG. 4 is a view showing a part of a hydraulic system of the automatic transmission in the hybrid drive system of FIG. 1.

In FIG. 4, reference numerals 70, 71 and 72 denote a 1–2 shift valve, a 2–3 shift valve and a 3–4 shift valve, respectively. Working fluid communications of ports of these shift valves 70, 71, 72 are indicated below the shift valves as shown in FIG. 4 in which the five forward-drive positions "1st", "2nd", "3rd", "4th" and "5th" are represented as "1", "2", "3", "4" and "5", respectively.

The 2–3 shift valve 71 has an input port 73 and a brake port 74 which communicate with each other when the automatic transmission 18 is placed in the first-speed position "1st" or the second-speed position "2nd". The above-indicated third brake B3 is connected to the brake port 74 through an oil passage 75. The oil passage 75 has an orifice 76, and a damper valve 77 is connected between the orifice 76 and the third brake B3. The damper valve 77 functions to absorb a small amount of the working oil to thereby achieve a damping action upon an abrupt rise of a line pressure PL applied to the third brake B3.

Reference numeral 78 in FIG. 4 denotes a B-3 control valve which is provided to directly regulate the engaging pressure of the third brake B3. The B-3 control valve 78 includes a spool 79, a plunger 80, and a spring 81 disposed between the spool 79 and the plunger 80. The B-3 control valve 78 has an input port 82 which is opened and closed by the spool 79 and to which the oil passage 75 is connected, and an output port 83 which is selectively communicable with the input port 82 and to which the third brake B3 is connected. The output port 82 is connected to a feedback port 84 which is partially defined by one end of the spool 79.

The B-3 control valve 78 further has a port 85 communicating with a chamber in which the spring 79 is disposed. The 2–3 shift valve 71 has a port 86 which produces a hydraulic pressure output (line pressure PL) when the automatic transmission 18 is placed in one of the forward-drive positions "3rd", "4th" and "5th". The port 86 is connected to the port 85 of the B-3 control valve 78 through an oil passage 87. The B-3 control valve 78 further has a control port 88 adjacent to one end of the plunger 80, and a linear solenoid valve SLU (FIG. 2) is connected to the control port 88, so that a pilot pressure $P_{SLU}$ generated by the linear solenoid valve SLU is applied to the control port 88. In this arrangement, the hydraulic pressure is regulated by the B-3 control valve 78, on the basis of the elastic force of the spring 81 and the hydraulic pressure applied to the port 85. The elastic force of the spring 81 increases with an increase in the pilot pressure $P_{SLU}$ applied to the control port 88.

Reference numeral 89 in FIG. 4 denotes a 2–3 timing valve which includes a spool 90, a first plunger 91, a spring 92 disposed between the spool 90 and the first plunger 91, and a second plunger 93 disposed on the side of the spool 90 remote from the first plunger 91, the spool 90 has a small-diameter land and two large-diameter lands having a larger diameter than the small-diameter land. The 2–3 timing valve 89 has a port 94 formed at an intermediate portion thereof. An oil passage 95 is connected to the port 94, and to a port 96 of the 2–3 shift valve 71, which port 96 is communicated with the brake port 74 when the automatic transmission 18 is placed in one of the forward-drive positions "3rd", "4th" and "5th".

The oil passage 95 has a branch connected through an orifice to a port 97 of the 2–3 timing valve 89, which port 97 is open between the above-indicated small-diameter land one of the two large-diameter lands of the spool 90. The 2–3 timing valve 89 further has a port 98 which is selectively communicable with the above-indicated port 94 and which is connected through an oil passage 99 to a solenoid relay valve 100.

The 2–3 timing valve 89 further has a port which is adjacent to one end of the first plunger 91 and which is connected to the linear solenoid valve SLU, and another port which is adjacent to one end of the second plunger 93 and which is connected through an orifice to the second brake B2.

The above-indicated oil passage 87 is provided to supply the working oil to the second brake B2 and to discharge the oil from this second brake B2. The oil passage 87 is provided with an orifice 401 having a small diameter, and an orifice 102 with a check ball. The oil passage 87 has a branch 103 which is provided with an orifice 104 having a large diameter. The orifice 104 is provided with a check ball which is moved to an open position when the oil is discharged from the second brake B2. The branch 103 is connected to an orifice control valve 105 described below.

The orifice control valve 105 is provided to control the rate of discharge flow of the oil from the second brake B2. This orifice control valve 105 includes a spool 106, and has a port 107 at an intermediate position. The port 107 is opened and closed by the spool 106 and connected to the second brake B2. The orifice control valve 105 further has a port 108 formed at a position below the port 107 as seen in FIG. 4. The above-indicated branch 103 of the oil passage 87 is connected to the port 108. The orifice control valve 105 further has a port 08 formed at a position above the port 107 as seen in FIG. 4.

The port 108 is selectively communicable with a drain port and is connected through an oil passage 110 to a port 111 of the B-3 control valve 78. The port 111 is selectively communicable with the output port 83 to which the third brake B3 is connected.

The orifice control valve 105 further has a control port 112 formed adjacent to one end of the spool 106 remote from the spring which acts on the spool 106. This control port 112 is connected through an oil passage 113 to a port 114 of the 3–4 shift valve 72. This port 114 produces an output pressure of the third solenoid-operated valve SL3 when the automatic transmission 18 is placed in any one of the forward-drive positions "3rd", "2nd" and "1st", and produces an output pressure of the fourth solenoid-operated valve SL4 when the automatic transmission 18 is placed in the fourth-speed position "4th" or fifth-speed position "5th".

The oil passage 95 has a branch 115 which is connected to the orifice control valve 105. The branch 115 is selectively communicable with the drain port of the orifice control valve 105.

The 2–3 shift valve 71 has a port 116 which produces the hydraulic pressure output (line pressure PL) when the automatic transmission 18 is placed in the first-speed position "1st" or second-speed position "2nd". This port 116 is connected through an oil passage 118 to a port 317 of the 2–3 timing valve 89 which is open to a chamber in which the spring 92 is disposed. The 3–4 shift valve 72 has a port 119 which is communicated with the above-indicated oil passage 87 when the automatic transmission 18 is placed in any one of the positions "3rd", "2nd" and "1st". The port 119 is connected through an oil passage 120 to a solenoid relay valve 100.

Figure 2:
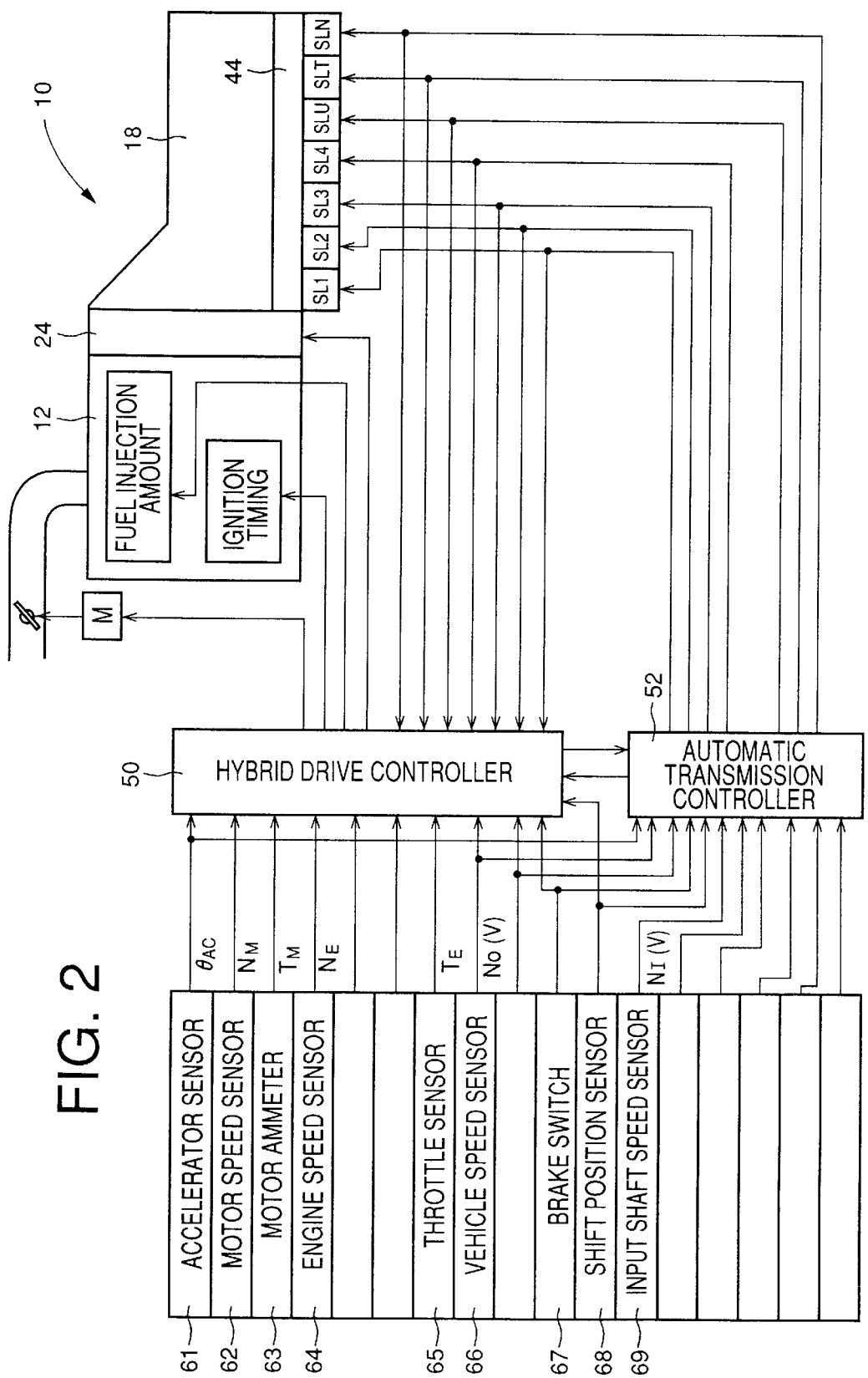
FIG. 2 is a view illustrating a control system for the hybrid drive system of FIG. 1.

Reference numeral 121 in FIG. 4 denotes an accumulator for the second brake B2. The accumulator 121 has a back-pressure chamber to which is applied an ACCUMULATOR CONTROL pressure Pac which is regulated on the basis of a pilot pressure $P_{SLN}$ received from a linear solenoid valve SLN (FIG. 2). When the 2–3 shift valve 71 is operated to shift up the automatic transmission 18 from the second-speed position "2nd" to the third-speed position "3rd", the second brake B2 receives FORWARD-DRIVE pressure (line pressure PL) from the port 86 through the oil passage 87, whereby a piston 121p of the accumulator 121 is moved up by this line pressure PL. While the piston 121p is moved up, the hydraulic pressure PB2 applied to the brake B2 is raised to a substantially fixed level corresponding to a sum of the downward biasing force of a spring 121s and a force based on the ACCUMULATOR CONTROL pressure Pac. Precisely, the above-indicated level gradually increases as the spring 121s is compressed. When the piston is moved to its upper end, the pressure becomes equal to the line pressure PL. That is, the transient pressure PB2 in the process of a 2–3 shift-up action of the automatic transmission 18 while the piston 121p is moved up is determined by the ACCUMULATOR CONTROL pressure Pac.

Figure 5:
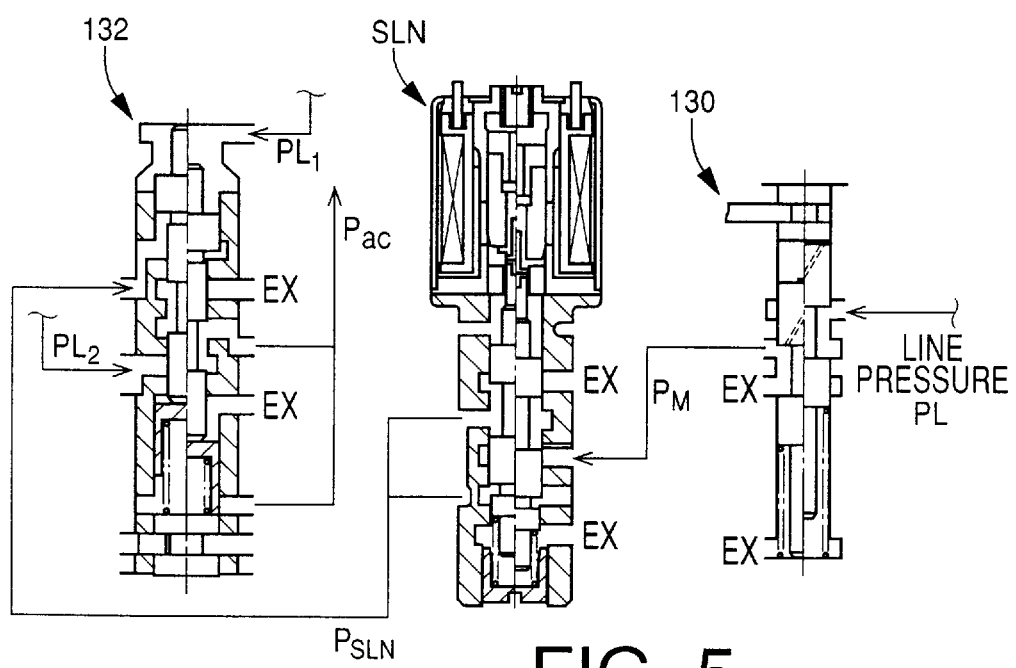
FIG. 5 is a hydraulic circuit diagram showing an arrangement for generating an ACCUMULATOR CONTROL pressure Pac in the hydraulic system of FIG. 4.

The linear solenoid valve SLN is adapted to generate the pilot pressure $P_{SLN}$ corresponding to a duty ratio of an electric current applied thereto, based on a MODULATOR pressure $P_M$ received from a modulator valve 130, as shown in FIG. 5. The pilot pressure $P_{SLN}$ generated by the linear solenoid valve SLN is applied to an accumulator control valve 132, which is adapted to regulate a second line pressure PL2 into the ACCUMULATOR CONTROL pressure Pac, on the basis of a first line pressure PL1 and the pilot pressure $P_{SLN}$. The linear solenoid valve SLN is arranged such that the pilot pressure $P_{SLN}$ increases with an increase in the duty ratio of the valve SLN. On the other hand, the accumulator control valve 132 is arranged such that the ACCUMULATOR CONTROL pressure Pac increases with a decrease in the pilot pressure $P_{SLN}$ received from the linear solenoid valve SLN. Accordingly, the engaging pressure PB2 (engaging force) of the second brake B2 during an engaging action thereof increases with a decrease in the pilot pressure $P_{SLN}$ of the linear solenoid valve SLN, namely, with a decrease in the duty ratio of the valve SLN.

The ACCUMULATOR CONTROL pressure Pac which is regulated by the linear solenoid valve SLN and accumulator control valve 132 and which is applied to the accumulator 121 for engaging the second brake B2 to establish the third-speed position "3rd" of the automatic transmission 18 is also applied to the other accumulators, that is, the accumulator for the clutch C1 which is engaged to establish the first-speed position "1st", the accumulator for the clutch C2 which is engaged to establish the fourth-speed position "4th", and the accumulator for the brake B0 which is engaged to establish the fifth-speed position "5th", so that the transient pressures of those clutches C1, C2 and brake B0 are controlled by the ACCUMULATOR CONTROL pressure Pac.

Reference numeral 122 in FIG. 4 denotes a C-0 exhaust valve, and reference numeral 123 denotes art accumulator for the clutch C0. The C-0 exhaust valve 122 is operated to place the clutch C0 in the engaged state for applying an engine brake to the vehicle when the automatic transmission 18 is shifted to the second-speed position "2nd" while the shift lever is placed in the position "2".

In the hydraulic control device 44 constructed as described above, a so-called "clutch-to-clutch" shift-up action of the automatic transmission 18 is effected by releasing the third brake B3 while at the same time engaging the second brake B2. In this case, the shifting shock of the automatic transmission 18 during this 2–3 shift-up action can be suitably reduced by controlling the hydraulic pressures of the third and second brakes B3, B2 during their releasing and engaging actions, on the basis of the torque of the input shaft 26 of the automatic transmission 18. In the other shifting actions of the automatic transmission 18, the transient pressures of the clutches C1, C2 and brake B0 are controlled by controlling the duty ratio of the linear solenoid valve SLN to suitably regulate the ACCUMULATOR CONTROL pressure Pac.

As shown in FIG. 2, the hybrid drive system 10 includes a hybrid drive controller 50 as well as the automatic transmission controller 52 indicated above. Each of these controllers 50, 52 is constituted principally by a microcomputer incorporating a central processing unit (CPU), a random-access memory (RAM), and a read-only memory (ROM). The controllers 50, 52 receive output signals of various detectors or sensors which include: an accelerator sensor 61 for detecting an operating amount $\theta_{AC}$ of an accelerator pedal; a motor speed sensor 62 for detecting speed $N_M$ of the motor/generator 14; a motor ammeter 63 for detecting an electric current of the motor/generator 14, which indicates torque $T_M$ of the motor 14; an engine speed sensor 64 for detecting speed $N_E$ of the engine 12; a throttle sensor 65 for detecting the opening angle of a throttle valve, which indicates torque $T_E$ of the engine 12; a vehicle speed sensor 66 for detecting the rotating speed $N_O$ of the output shaft 19 of the automatic transmission 18, which indicates running speed V of the motor vehicle; a brake switch 67 for detecting an operation of a brake pedal; a shift position sensor 68 for detecting the currently selected position of the shift lever; and an input shaft speed sensor 69 for detecting the rotating speed $N_I$ of the input shaft 26 of the automatic transmission 18.

The hybrid drive controller 50 is adapted to control the opening angle of the throttle valve, and the fuel injection and ignition timing of the engine 12, so that the output of the engine 12 is controlled depending upon the specific running condition of the vehicle.

Figure 6:
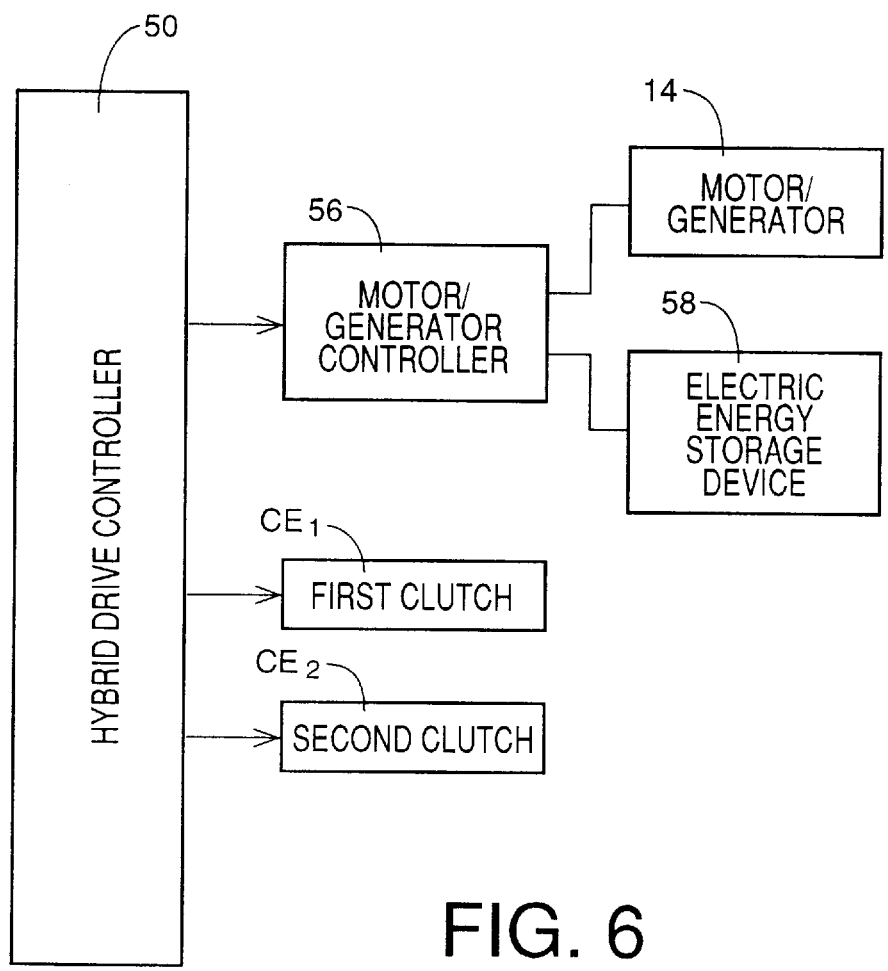
FIG. 6 is a block diagram showing connection between a hybrid drive controller shown in FIG. 2 and an electrically operated torque converter shown in FIG. 1.

The motor/generator 14 is connected to an electric energy storage device 58 through a motor/generator controller 56, as indicated in FIG. 6. The hybrid drive controller 50 is adapted to control the motor/generator controller 56 to place the motor/generator 14 selectively in one of a DRIVE state, a CHARGING state and a NON-LOAD or FREE state. In the DRIVE state, the motor/generator 214 is operated as an electric motor to provide a predetermined torque, with an electric energy being supplied thereto from the electric energy storage device 58. In the CHARGING state, the motor/generator 14 is operated as an electric generator or dynamo, by regenerative braking (i.e., electric braking torque of the motor/generator per se), so as to charge the electric energy storage device 58 with the electric energy. In the NON-LOAD or FREE state, the motor/generator 14 is placed in a non-load condition permitting free rotation of the rotor shaft 14r.

The first and second clutches CE1, CE2 are controlled by the hybrid drive controllers 50 through solenoid-operated valves of the hydraulic circuit. The automatic transmission 18 is controlled by the automatic transmission controller 52 through the above-indicated solenoid-operated valves SL1–SL4 and linear solenoid valves SLU, SLT and SLN of the hydraulic control device 44, so that the automatic transmission 18 is shifted to the optimum position depending upon the running condition of the vehicle, for example, depending upon the operation amount $\theta_{AC}$ of the accelerator pedal and the vehicle running speed V, and according to a selected one of predetermined shift patterns.

Figure 7:
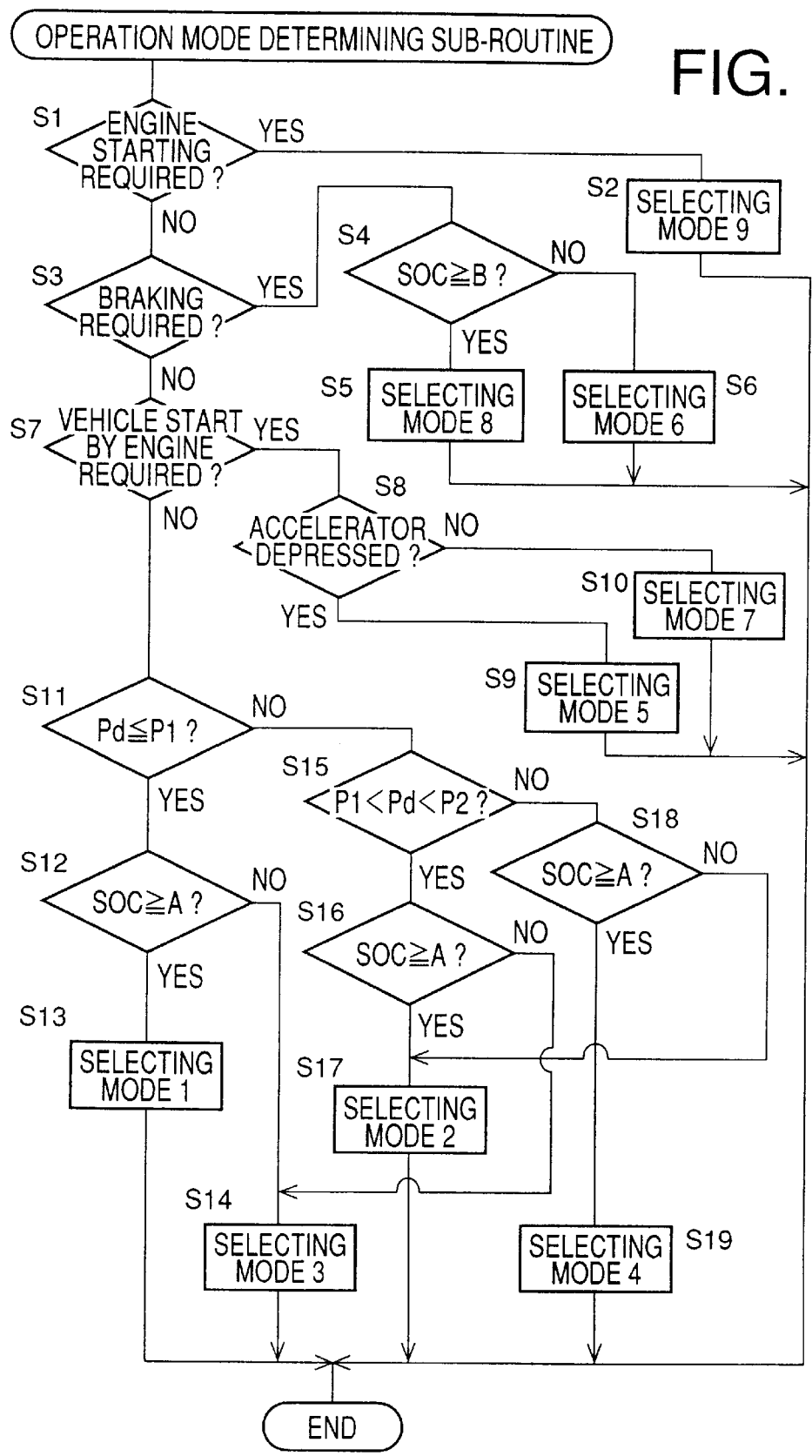
FIG. 7 is a flow chart illustrating an operation mode determining sub-routine executed by the hybrid drive controller.

The hybrid drive controller 50 is adapted to execute an operation mode determining sub-routine illustrated in the flow chart of FIG. 7, for selecting one of nine operation modes of the hybrid drive system 10 indicated in FIG. 8, and for operating the engine 12 and the electrically controlled torque converter 24 in the selected mode, as disclosed in U.S. patent application Ser. No. 08/746,483 filed Nov. 12, 1996. As shown in FIG. 2, the hybrid drive controller 50 is adapted to receive the output signals of the various sensors described above.

The engine torque $T_E$ can be obtained from the opening of the throttle valve as detected by the throttle sensor 65, or from the amount of fuel injection into the engine 12. The motor torque $T_M$ can be obtained from the electric current of the motor/generator 14 as detected by the motor ammeter 63. An amount of electric energy SOC stored in the electric energy storage device 58 can be obtained from the electric current or charging efficiency of the motor/generator 14 when it is operated as the electric generator to charge the storage device 58.

The operation mode determining sub-routine of FIG. 7 is initiated with step S1 to determine whether there exists a command requiring the engine 12 to be started, for driving the vehicle with the engine 12 used as the drive power source or for operating the motor/generator 14 for charging the electric energy storage device 58.

If an affirmative decision (YES) is obtained in step S1, the control flow goes to step S2 to select an operation mode 9. In this operation mode 9, the first and second clutches CE1, CE2 are both engaged (turned ON) as indicated in the table of FIG. 8, and the motor/generator 14 is operated to start the engine 12 through the planetary gear device 16, with the fuel injection amount and other conditions of the engine 10 being suitably controlled.

When this operation mode 9 is selected while the vehicle is stationary, the starting of the engine 12 is effected with the automatic transmission 18 placed in the neutral position "N". When the operation mode 9 is selected during running of the vehicle with the motor/generator 14 as the drive power source as in an operation mode 1 in which the first clutch CE1 is in the released state, the first clutch CE1 is engaged, and the motor/generator 14 is operated so as to provide an output which is larger than the output necessary to drive the vehicle by a given surplus amount, so that the engine 12 is started by the surplus output of the motor/generator 14.

Even when the vehicle is running, the engine 12 can be started in the operation mode 9 by temporarily placing the automatic transmission 18 in the neutral position. Thus, the engine 12 can be started by the motor/generator 14. This arrangement eliminates an exclusive starter (e.g., electric motor) for starting the engine 12, whereby the hybrid drive system 10 is available at a reduced cost.

If a negative decision (NO) is obtained in step S1, that is, if no command requiring the starting of the engine 12 is present, the control flow goes to step S3 to determine whether brake application to the vehicle is required. For example, this determination may be effected by determining (a) whether a braking system of the vehicle is activated (whether the brake pedal has been depressed) or not, (b) whether the shift lever is placed in the engine braking position "L" or "2" with the operation amount $\theta_{AC}$ of the acceleration pedal being zero, or (c) whether the operation amount $\theta_{AC}$ of the accelerator pedal is zero. In the engine braking position "L" or "2", an engine brake is generally applied to the vehicle when the operation amount $\theta_{AC}$ of the accelerator pedal is zero.

If an affirmative decision (YES) is obtained in step S3, the control flow goes to step S4 to determine whether the amount of electric energy SOC stored in the electric energy storage device 58 is equal to or larger than a predetermined upper limit B. If an affirmative decision (YES) is obtained in step S4, the control flow goes to step S5 to select an operation mode 8. If a negative decision (NO) is obtained in step S4, the control flow goes to step S6 to select an operation mode 6. The upper limit B is an upper limit of the stored electric energy amount SOC below which the electric energy storage device 58 is permitted to be charged. The upper limit B is determined depending upon the charging and discharging efficiencies of the electric energy storage device 58. For instance, the upper limit B is about 80% of the full capacity of the electric energy storage device 58.

In the operation mode 8 selected in step S5, the first and second clutches CE1, CE2 are both engaged (turned ON), as indicated in the table of FIG. 8, and the motor/generator 14 is placed in the NON-LOAD state. Further, the engine 12 is turned OFF, that is, the throttle valve is closed, and the fuel injection amount if zeroed. As a result, an engine brake due to the drag resistance of the engine 12 is applied to the vehicle, whereby the required amount of operation of the brake pedal by the vehicle operator is reduced, facilitating the control of the vehicle running. Since the motor/generator 214 is placed in the NON-LOAD state and permitted to rotate freely in the operation mode 8, the electric energy storage device 58 is protected from excessive charging and resulting deterioration of its charging and discharging efficiencies.

In the operation mode 6 selected in step S6, the first clutch CE1 is released (turned OFF) and the second clutch CE2 is engaged (turned ON), while the engine 212 is turned OFF, and the motor/generator 14 is placed in the CHARGING state, as indicated in the table of FIG. 8, whereby the motor/generator 14 is driven by a kinetic energy of the motor vehicle, so as to charge the electric energy storage device 58 while applying a regenerative brake to the vehicle. The regenerative braking reduces the required amount of operation of the brake pedal and facilitates the control of the vehicle running.

In the operation mode 6 wherein the engine 12 is disconnected from the planetary gear device 16 with the first clutch CE1 placed in the released state, the energy loss of the vehicle due to the drag resistance of the engine 12 is prevented. Further, since the operation mode 6 is selected when the stored electric energy amount SOC is smaller than the upper limit B, the electric energy storage device 58 is protected from excessive charging and resulting deterioration of its charging and discharging efficiencies.

If a negative decision (NO) is obtained in step S3, that is, if no command requiring brake application to the vehicle is present, the control flow goes to step S7 to determine whether the vehicle is required to be started by operation of the engine 12. This determination may be effected by determining whether the vehicle is in a temporary stop during running of the vehicle with the engine 212 used as the drive power source as in an operation mode 3 (which will be described). For instance, the temporary stopping of the vehicle can be detected by checking if the output speed $N_O$ of the output shaft 19 of the automatic transmission 18 is zero. Namely, the output shaft speed $N_O$ is zero when the vehicle is stationary.

If an affirmative decision (YES) is obtained in step S7, the control flow goes to step S8 to determine whether the accelerator pedal is in a depressed state, more specifically, whether the operation amount $\theta_{AC}$ of the accelerator pedal is larger than a predetermined lower limit which is close to zero but larger than zero. If an affirmative decision (YES) is obtained in step S8, that is, if the accelerator pedal is in a depressed state, the control flow goes to step S9 to select an operation mode 5. If a negative decision (NO) is obtained in step S8, the control flow goes to step S10 to select an operation mode 7.

In the operation mode 5 selected in step S9, the first clutch CE1 is engaged (turned ON) and the second clutch CE2 is released (turned OFF), and the engine 12 is operated, as indicated in the table of FIG. 8, whereby the vehicle is started by the engine 12, with the regenerative braking torque of the motor/generator 14 being suitably controlled.

Described in detail, the ratios of the engine torque $T_E$, output torque of the planetary gear device 16 and motor torque $T_M$ are 1:(1+ρE):ρE, where ρE represents a gear ratio of the planetary gear device 16 (ρ=number of teeth of the sun gear 16s divided by number of teeth of the ring gear 16r). When the gear ratio ρE is about 0.5 (as in a common planetary gear device), for example, the torque of the motor/generator 14 is controlled to be equal to a half of the engine torque $T_E$, so that the torque about 1.5 times the engine torque $T_E$ is produced from the carrier 16c of the planetary gear device 16.

In the above arrangement, the vehicle can be started with a torque as large as (1+ρE)/ρE times the torque of the motor/generator 14. If the motor/generator 14 is held in the NON-LOAD state with no current applied to the motor, the output of the carrier 16c is zeroed with the rotor shaft 14r merely rotating in the reverse direction, whereby the vehicle is held stationary.

In the above case, the planetary gear device 16 functions as a vehicle start clutch and a torque booster. With the motor torque $T_M$ (regenerative braking torque) gradually increased from zero to increase a reaction force of the motor/generator 14, the vehicle can be smoothly started with the output torque which is (1+ρ) times the engine torque $T_E$.

The motor/generator 14 used in the hybrid drive system 10 of the present embodiment has a torque capacity which is about ρE times the maximum torque of the engine 12. Namely, the torque capacity and size of the motor/generator 14 are minimized to minimize the size and cost of manufacture of the hybrid drive system 10, while assuring the required torque.

The present hybrid drive system 10 is further adapted so that the opening angle of the throttle valve and the fuel injection amount are increased with an increase in the motor torque $T_M$, for preventing stalling of the engine 12 due to a drop of the engine speed $N_E$ due to an increase in the reaction force of the motor/generator 14.

In the operation mode 7 selected in step S10, the first clutch CE1 is engaged (turned ON) and the second clutch CE2 is released (turned OFF), and the engine 12 is operated while the motor/generator 14 is placed in the NON-LOAD state so that the hybrid drive system 10 is placed in an electrically neutral state, as indicated in the table of FIG. 8. In this operation mode 7, the output of the carrier 16c is zeroed with the rotor shaft 14r of the motor/generator 214 rotating freely in the reverse direction. When this operation mode 7 is established during running of the vehicle with the engine 12 operated as the drive power source as in the operation mode 3, the stopping of the vehicle does not require the engine 12 to be turned OFF, and the vehicle can be started by the engine 10 as in the operation mode 5.

If a negative decision (NO) is obtained in step S7, that is, if the starting of the vehicle by the engine 12 is not required, the control flow goes to step S11 to determine whether a currently required output Pd of the hybrid drive system 10 is equal to or smaller than a predetermined first threshold value P1. The currently required output Pd is an output of the hybrid drive system 210 required to drive the vehicle against a running resistance. This currently required output Pd is calculated according to a predetermined data map or equation, on the basis of the operation amount $\theta_{AC}$ of the accelerator pedal, a rate of change of this value $\theta_{AC}$, running speed of the vehicle (speed $N_O$ of the output shaft 19), or the currently established operating position of the automatic transmission 18.

The predetermined first threshold value P1 is a boundary value of the output above which the vehicle is driven with only the engine 12 used as the drive power source and below which the vehicle is driven with only the motor/generator 14 as the drive power source. In other words, the vehicle is considered to be in a medium-load or high-load running state if the currently required output Pd is larger than the first threshold value P1, and in a low-load running state if the currently required output Pd is equal to or smaller than the first threshold value P1. For example, the first threshold value P1 is determined by experiments, so as to minimize the exhaust gas emissions and the fuel consumption, depending upon the energy efficiency during running of the vehicle (in which the electric energy storage device 58 may be charged by operation of the engine 12).

If the currently required output Pd is equal to or smaller than the first threshold value P1, the control flow goes to step S12 to determine whether the stored electric energy amount SOC is equal to or larger than a predetermined lower limit A. If an affirmative decision (YES) is obtained in step S12, the control flow goes to step S13 to select an operation mode 1. If a negative decision (NO) is obtained in step S12, the control flow goes to step S14 to select an operation mode 3.

The lower limit A is a lower limit of the stored electric energy amount SOC above which the electric energy stored in the storage device 58 can be used to operate the motor/generator 14 as the drive power source. The lower limit A is determined depending upon the charging and discharging efficiencies of the storage device 58. For instance, the lower limit A is about 70% of the full capacity of the storage device 58.

In the operation mode 1 selected in step S13, the first clutch CE1 is released (turned OFF) and the second clutch CE2 is engaged (turned ON), and the engine 12 is turned OFF, while the motor/generator 14 is operated so as to provide the currently required output Pd, as indicated in the table of FIG. 8, so that the vehicle is driven with only the motor/generator 14 used as the drive power source.

In this operation mode 1, too, the engine 12 is disconnected from the planetary gear device 16, so that the energy loss due to the drag resistance of the engine 12 is prevented as in the operation mode 6, and the motor can be suitably operated with high efficiency with the automatic transmission 18 being suitably shifted.

It is also noted that the operation mode 1 is selected, that is, the motor/generator 14 is used as the drive power source, when the currently required output Pd is equal to or smaller than the first threshold value P1 while the electric energy amount SOC stored in the storage device 58 is equal to or larger than the lower limit A. In this condition, the energy efficiency is higher and the fuel consumption and the amount of exhaust emissions can be made smaller when the vehicle is driven by the motor/generator 14 (in the operation mode 1) than when the vehicle is driven by the engine 12 (in the operation mode 2). Further, the electric energy storage device 58 is protected from excessive energy consumption with the stored electric energy amount SOC falling below the lower limit A, which would result in deterioration of the charging and discharging efficiencies of the storage device 58.

In the operation mode 3 selected in step S14, the first and second clutches CE1, CE2 are both engaged (turned ON), and the engine 12 is turned ON, while the motor/generator 14 is placed in the CHARGING state to charge the electric energy storage device 58 with regenerative braking, as indicated in the table of FIG. 8, whereby the vehicle is driven by the output of the engine 12 while the electric energy storage device 58 is charged with the electric energy generated by the motor/generator 14. In this operation mode 3, the engine 12 is operated so as to provide an output larger than the currently required output Pd, and the electric current of the motor/generator 14 is controlled so that a surplus output of the engine 12 is consumed by the motor/generator 14 to charge the storage device 258.

If a negative decision (NO) is obtained in step S11, that is, if the currently required output Pd is larger than the first threshold value P1, the control flow goes to step S15 to determine whether the currently required output Pd is smaller than a predetermined second threshold P2 which is larger than the first threshold P1, that is, whether the currently required output Pd is larger than the first threshold P1 and smaller than the second threshold P2, namely, within a predetermined range between P1 and P2.

This second threshold value P2 is a boundary value of the output below which the vehicle is driven with only the engine 12 used as the drive power source and above which the vehicle is driven with both the engine 12 and the motor/generator 14 as the drive power sources. In other words, the vehicle is considered to be in the medium-load running state if the currently required output Pd is smaller than the second threshold value P2, and in the high-load running state if the currently required output Pd is equal to or larger than the second threshold value P2. For example, the second threshold value P2 is determined by experiments, so as to minimize the exhaust gas emissions and the fuel consumption, depending upon the energy efficiency during running of the vehicle (in which the electric energy storage device 58 may be charged by operation of the engine 12).

If the currently required output Pd is larger than the first threshold P1 and smaller than the second threshold P2, that is, if an affirmative decision (YES) is obtained in step S15, the control flow goes to step S16 to determine whether the storage electric energy amount SOC is equal to or larger than the above-indicated predetermined lower limit A. If an affirmative decision (YES) is obtained in step S16, the control flow goes to step S17 to select an operation mode 2. If a negative decision (NO) is obtained in step S16, the control flow goes to step S14 to select the operation mode 3 discussed above.

If the currently required output Pd is equal to or larger than the second threshold P2, that is, if a negative decision (NO) is obtained in step S15, the control flow goes to step S18 to determine whether the stored electric energy amount SOC is equal to or larger than the lower limit A. If an affirmative decision (YES) is obtained in step S18, the control flow goes to step S19 to select an operation mode 4. If a negative decision (NO) is obtained in step S18, the control flow goes to step S17 to select the operation mode 2.

In the operation mode 2 selected in step S17, the first and second clutches CE1, CE2 are both engaged (turned ON), and the engine 12 is operated so as to produce the currently required output Pd, while the motor/generator 14 is placed in the NON-LOAD state, as indicated in FIG. 8, whereby the vehicle is driven with only the engine 12 used as the drive power source.

In the operation mode 4 selected in step S19, the first and second clutches CE1, CE2 are both engaged (turned ON), and the engine 12 and the motor/generator 14 are both operated, as indicated in the table of FIG. 8, whereby the vehicle is driven with both the engine 12 and the motor/generator 14 used as the drive power sources.

In the operation mode 4 selected when the currently required output Pd is equal to the second threshold P2 or larger, the engine 12 and the motor/generator 14 are both operated as the drive power sources to drive the vehicle, so that the energy efficiency is less likely to be lowered than in the operation mode 1 or 2 in which either the engine 12 or the motor/generator 14 is used as the drive power source. In this respect, the fuel consumption and the exhaust gas emissions can be made smaller in this operation mode 4 than in the operation mode 1 or 2 when the currently required output Pd is equal to the second threshold P2 or larger. Further, since the operation mode 4 is selected only when the stored electric energy amount SOC is equal to or larger than the lower limit A, the electric energy storage device 58 is protected from excessive energy consumption with the stored energy amount SOC falling below the lower limit A, which would result in deterioration of the charging and discharging efficiencies of the storage device 58.

As described above, the operation modes 1–4 are selected in the following running states of the vehicle. When the electric energy amount SOC stored in the electric energy storage device 58 is not smaller than the lower limit A, the operation mode 1 is selected in step S13 to drive the vehicle with only the motor/generator 14 as the drive power source if the vehicle is in the low-load running state with the currently required output Pd being equal to or smaller than the first threshold P1. Further, the operation mode 2 is selected in step S17 to drive the vehicle with only the engine 12 as the drive power source if the vehicle is in the medium-load running state with the currently required output Pd being larger than the first threshold P1 and smaller than the second threshold P2, and the operation mode 4 is selected in step S19 to drive the vehicle with both of the engine 12 and the motor/generator 14 as the drive power sources if the vehicle is in the high-load running state with the currently required output Pd being equal to or larger than the second threshold P2.

When the stored electric energy amount SOC is smaller than the lower limit A, the operation mode 3 is selected in step S14 to drive the vehicle with only the engine 12 as the drive power source while at the same time charging the electric energy storage device 58 if the vehicle is in the medium-load running state with the currently required output Pd being smaller than the second threshold P2, and the operation mode 2 is selected in step S17 to drive the vehicle with only the engine 12 without charging the storage device 58 if the vehicle is in the high-load running state with the currently required output Pd being equal to or larger than the second threshold P2.

The operation mode 2 is selected in step S17 in the following two cases: 1) when the vehicle is in the medium-load running state wherein the currently required output Pd is larger than the first threshold P1 and smaller than the second threshold P2, while the stored electric energy amount SOC is not smaller than the lower limit A; and 2) when the vehicle is in the high-load running state wherein the currently required output Pd is equal to or larger than the second threshold P2, while the stored electric energy amount SOC is smaller than the lower limit A. In the medium-load running state of the vehicle, the energy efficiency is generally higher when the vehicle is driven by the engine 12 than when the vehicle is driven by the motor/generator 14. Accordingly, the fuel consumption and exhaust gas emission can be made smaller in the operation mode 2 than in the operation mode 1.

In the high-load running state, it is generally desirable to select the operation mode 4 in which the vehicle is driven by both of the engine 12 and the motor/generator 14. When the electric energy amount SOC stored in the electric energy storage device 58 is smaller than the lower limit A, however, it is desirable to select the operation mode 2, that is, to drive the vehicle with only the engine 12 used as the drive power source, in order to prevent deterioration of the charging and discharging efficiencies of the storage device 58 due to reduction of the stored electric energy amount SOC below the lower limit A.

Figure 9:
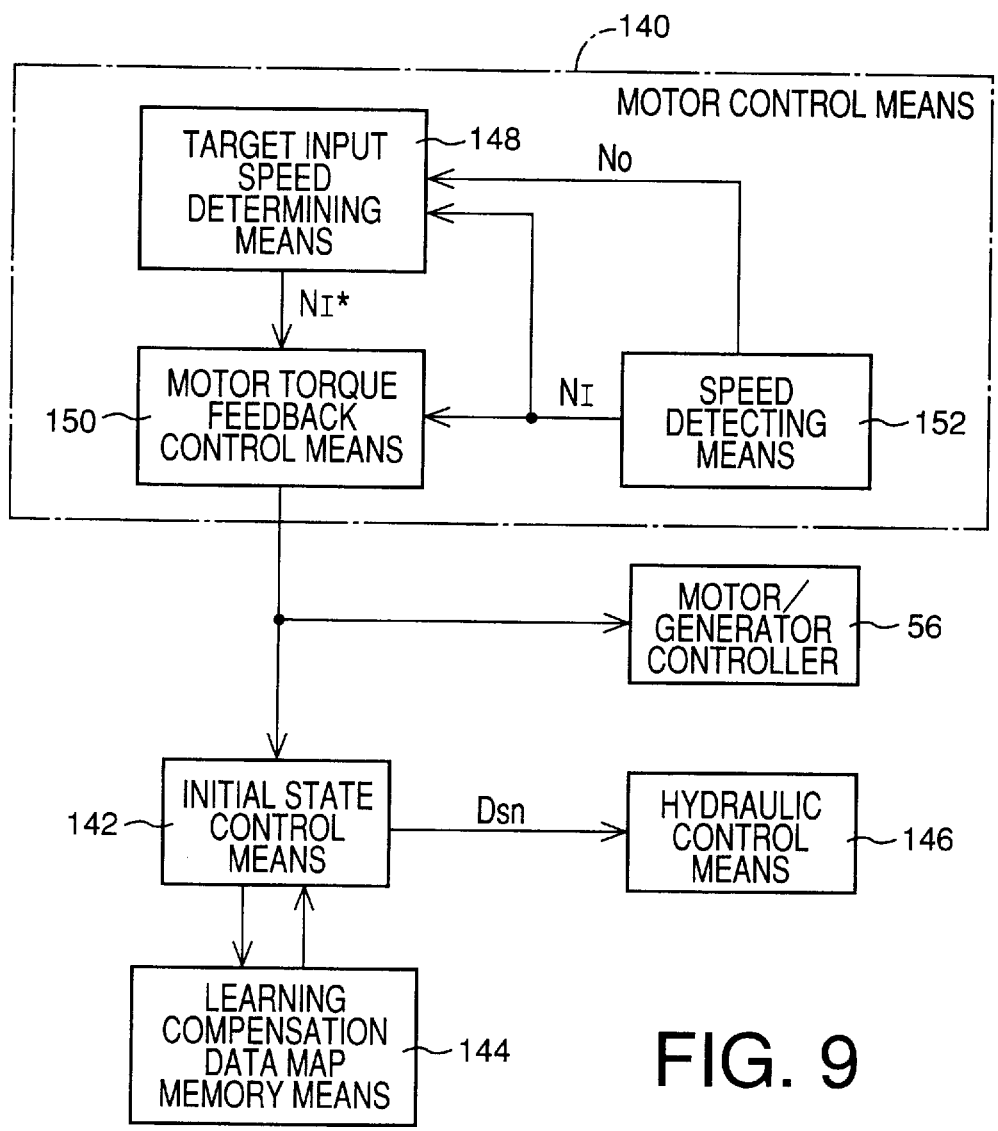
FIG. 9 is a block diagram for explaining the functions of various functional means of the shift control apparatus.

The automatic transmission 18 is controlled according to the principle of the present invention, by the shift control apparatus which includes motor control means 140, initial state control means 142, learning compensation data map memory means 144, and hydraulic control means 146, as shown in the block diagram of FIG. 9. The shift control apparatus is adapted to execute a transmission shift control routine illustrated in the flow chart of FIG. 10.

As indicated in FIG. 9, the motor control means 140 includes target input speed determining means 148, motor torque feedback control means 150, and speed detecting means 152. The speed detecting means 152 includes the input shaft speed sensor 69 for detecting the speed $N_I$ of the input shaft 26 of the automatic transmission 18, and the vehicle speed sensor 66 for detecting the speed $N_O$ of the output shaft 19 of the automatic transmission 18. The input shaft speed $N_I$ varies during a shifting action of the automatic transmission 18.

The hydraulic control means 146, which is constituted by the linear solenoid valves SLN and SLU, is adapted to control initial hydraulic pressures or engaging forces of coupling means in the form of the clutches C1, C2 and brakes B0, B2 and B3 which are selectively engaged and released for shifting the automatic transmission 18.

The hybrid drive controller 50 and the automatic transmission controller 52 cooperate to function as the initial state control means 142, target input speed determining means 148 and motor torque feedback control means 150. It will be understood that steps SA3, SA4 and SA12–SA17 of the transmission shift control routine of FIG. 10 correspond to the initial state control means 142, while step SA7 of the routine of FIG. 10 corresponds to the motor control means 140.

Figure 10:
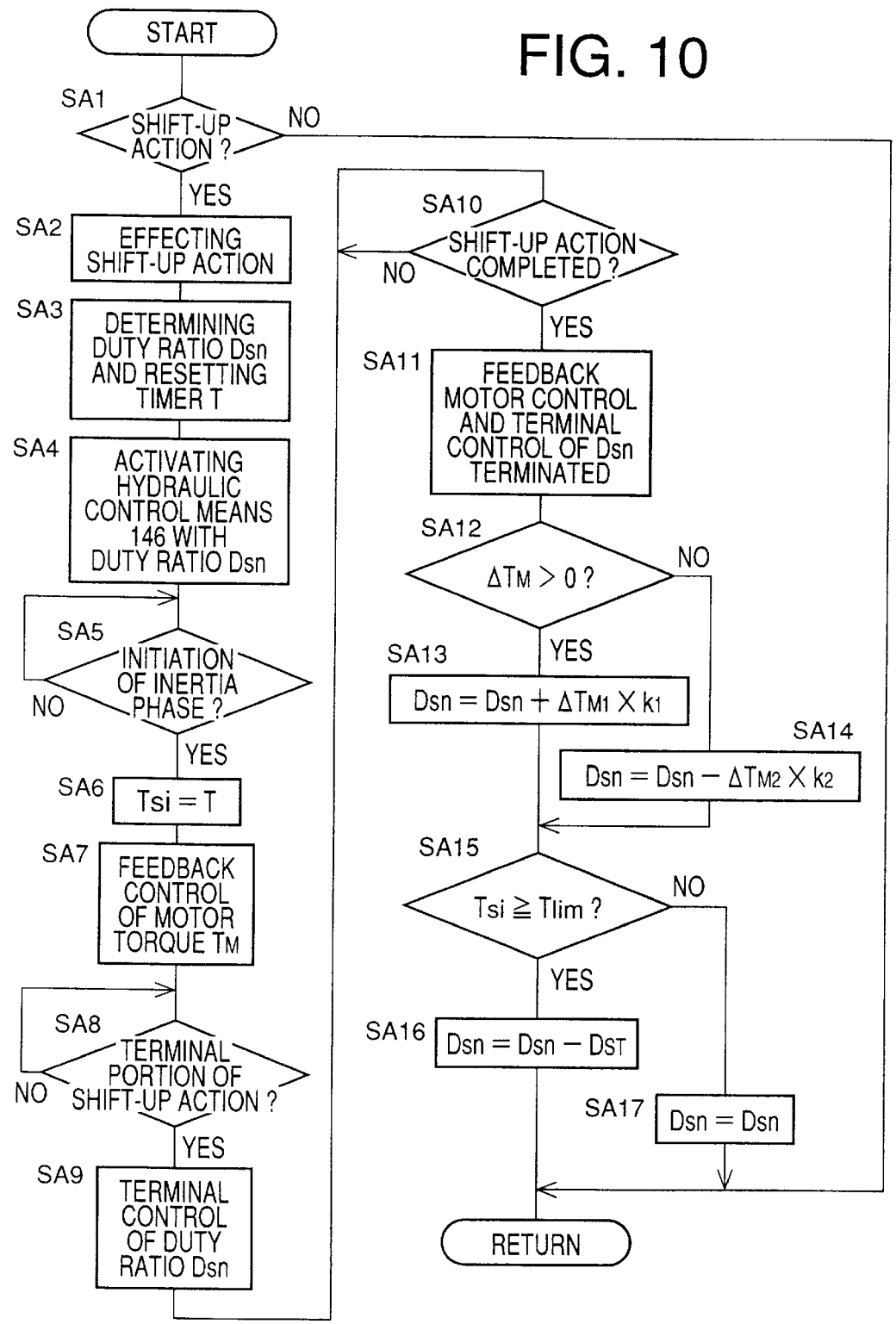
FIG. 10 is a flow chart illustrating a transmission shift control routine executed by the transmission shift control apparatus.

The transmission shift control routine of FIG. 10 is initiated with step SA1 to determine whether the automatic transmission 18 should be shifted up. This determination is effected on the basis of the operating amount $\theta_{AC}$ of the accelerator pedal and the vehicle running speed V. Although the principle of the present invention is applicable to both shift-up actions and shift-down actions of the automatic transmission 18, the routine of FIG. 10 will be explained with respect to a shift-up action of the automatic transmission 18, since the shift-up actions generally tend to cause a shifting shock. If an affirmative decision (YES) is obtained in step SA1, the control flow goes to step SA2 in which a shift-up command is generated to initiate the shift-up action of the automatic transmission 18, with the solenoid valves SL1–SL4 being suitably controlled.

Step SA2 is followed by step SA3 to determine the duty ratio $D_{sn}$ of the hydraulic control means 146 (linear solenoid valves SLN, SLU), on the basis of various parameters indicative of the vehicle condition, and according to learning compensation data maps stored in the learning compensation data map memory means 144. The parameters indicated include, for example, the currently established operation mode of the hybrid drive system 10, the kind of the required shift-up action of the automatic transmission 18, and the input torque (torque of the input shaft 26) which may be represented by the operating amount $\theta_{AC}$ of the accelerator pedal or the opening angle of the throttle valve. The data maps stored in the data map memory means 144 represent relationships between the duty ratio $D_{sn}$ of the hydraulic control means 146 and the various parameters indicated above. These data maps are updated by a learning compensation technique as described below with respect to steps SA11–SA17 of the transmission shift control routine of FIG. 10. Step SA3 is also adapted to reset a timer T, which is provided to measure a time Tsi between the moment of generation of the shift-up command to initiate the shift-up action of the automatic transmission 18 and the moment of initiation of an inertia phase of the automatic transmission.

Then, the control flow goes to step SA4 in which the electric current applied to the hydraulic control means 146 is controlled according to the determined duty ratio $D_{sn}$, to thereby control the initial hydraulic pressures of the coupling means associated with the required shift-up action of the automatic transmission 18. Step SA4 is followed by step SA5 to determine whether the inertia phase of the automatic transmission 18 is initiated. This determination is effected by determining whether the following inequality (1) is satisfied:

$$N_I < N_O \times i_L - \alpha \quad (1)$$

In the above inequality, "$i_L$" represents the speed ratio of the operating position of the transmission 18 established prior to the shift-up action, and "$\alpha$" is a constant which is close to zero and determined with the detecting errors of $N_I$ and $N_O$ taken into account.

If an affirmative decision (YES) is obtained in step SA5, the control flow goes to step SA6 in which the content of the timer T is stored in a memory, as the time Tsi between the generation of the shift-up command and the initiation of the inertia phase of the automatic transmission 18. Step SA6 is followed by step SA7 in which the torque $T_M$ of the motor/generator 14 is controlled in a feedback fashion, according to a motor torque feedback control sub-routine illustrated in the flow chart of FIG. 11. It will be understood that steps SF1, SF2 and SF3 of the sub-routine of FIG. 11 correspond to the target input speed determining means 148, while steps SF3–SF10 of the sub-routine of FIG. 11 correspond to the motor torque feedback control means 150.

Figure 11:
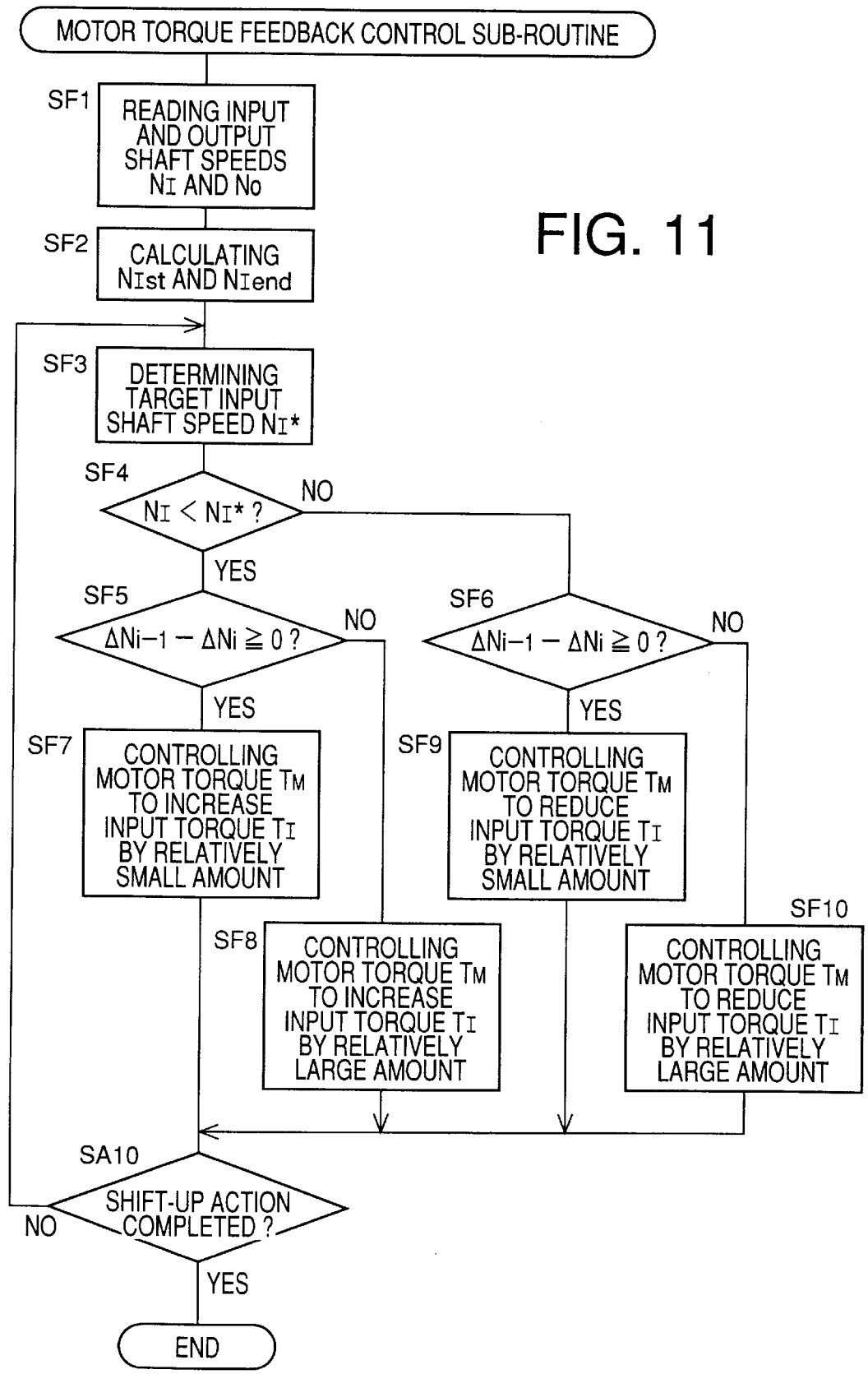
FIG. 11 is a flow chart illustrating a motor torque feedback control sub-routine executed in step SA7 of the routine of FIG. 10.

The motor torque feedback control sub-routine of FIG. 11 is initiated with step SF1 to read the input shaft speed $N_I$ and the output shaft speed $N_O$. Step SF1 is followed by step SF2 to calculate a start value $N_{Ist}$ and an end value $N_{Iend}$ of the input shaft speed $N_I$, according to the following equations (2) and (3), respectively:

$$N_{Ist} = N_O \times i_L \quad (2)$$

$$N_{Iend} = N_O \times i_H \quad (3)$$

In the above equation, "$i_H$" represents the speed ratio of the operating position of the automatic transmission 18 established after the shift-up action in question.

Then, the control flow goes to step SF3 to calculate a target value $N_I^*$ of the input shaft speed $N_I$ according to the following equation (4):

$$N_I^* = (N_{Iend} - N_{Ist}) tf/ts + N_{Ist} \quad (4)$$

In the above equation (4), "ts" represents a shifting time, namely, a time of the shift-up action of the automatic transmission 18, while "tf" represents a time after the initiation of the feedback control of the motor torque $T_M$ (after the initiation of the inertia phase).

Figure 12:
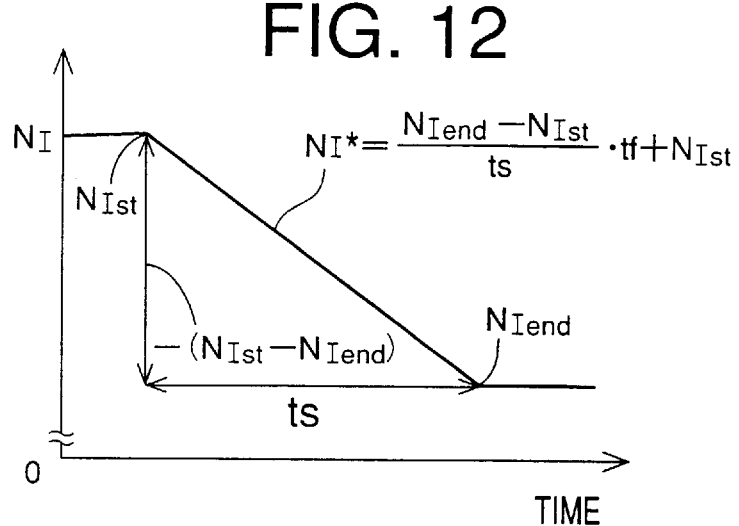
FIG. 12 is a view for explaining a target input shaft speed $N_I^*$ determined in step SF3 of the sub-routine of FIG. 11.

The target input shaft speed $N_I^*$ is a desired speed $N_I$ of the input shaft 26 in the process of the shift-up action of the automatic transmission 18. According to the above equation (4), this target input shaft speed $N_I^*$ varies with the time tf. While the shifting time ts may be a predetermined constant time, it is desirably changed on the basis of a suitable parameter such as the kind of the shift-up action or the input shaft torque of the automatic transmission 18, and according to a predetermined relationship between the above-indicated parameter and the shifting time ts. This relationship may be represented by an equation or data map stored in a memory. A graph of FIG. 12 indicates a relationship among the start and end values $N_{Ist}$, $N_{Iend}$ and the target value $N_I^*$ of the input shaft speed $N_I$.

Step SF3 is followed by step SF4 to determine whether the input shaft speed $N_I$ is smaller than the target value $N_I^*$. If an affirmative decision (YES) is obtained in step SF4, the control flow goes to step SF5. If a negative decision (NO) is obtained in step SF4, the control flow goes to step SF6. Steps SF5 and SF6 are provided to determine whether a difference $\Delta N_{i-1} - \Delta N_i$ is equal to or larger than zero. Depending upon affirmative or negative decision obtained in steps SF5 and SF6, the torque $T_M$ of the motor/generator 14 is controlled in a selected one of different manners in steps SF7 through SF10. "$\Delta N_i$" represents an absolute value of a difference or error of the detected input shaft speed $N_I$ from the target value $N_I^*$, which is obtained in the present control cycle, while "$\Delta N_{i-1}$" represents the absolute value of the difference or error obtained in the last control cycle.

Figure 13A:
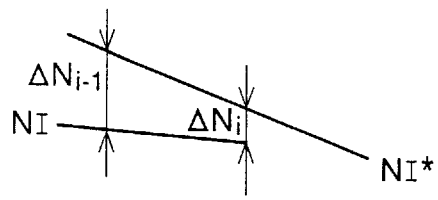
FIGS. 13A, 13B, 13C and 13D are views for explaining determination in steps SF5 and SF6 of the sub-routine of FIG. 11.
Figure 13B:
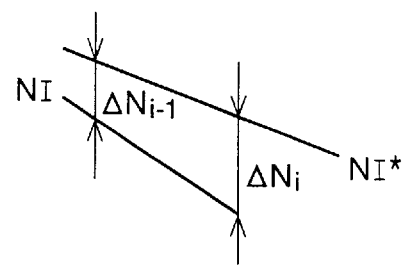

If an affirmative decision (YES) is obtained in step SF4, namely, if the detected input shaft speed $N_I$ is lower than the target value $N_I^*$, it means that the speed at which the shift-up action of the automatic transmission 18 is taking place is higher than an optimum value, or that the rate of change of the input shaft speed $N_I$ during the shift-up action is higher than an optimum value. This phenomenon occurs because the torque $T_I$ of the input shaft 26 of the automatic transmission 18 is smaller than an optimum value, in relation to the engaging force or pressure of the coupling means to achieve the shift-up action in question. In this case, therefore, the motor torque $T_M$ is controlled so as to increase the input torque $T_I$ of the automatic transmission 18. If an affirmative decision (YES) is obtained in step SF5, namely, if the error $|\Delta N_{i-1} - \Delta N_i|$ of the detected actual input shaft speed $N_I$ from the target value $N_I^*$ is equal to or larger than zero, it means that the error tends to be decreasing as indicated in FIG. 13A. In this instance, the motor torque $T_M$ is controlled in step SF7 so as to increase the input torque $T_I$ by a relatively small amount. If a negative decision (NO) is obtained in step SF5, namely, if the error $|\Delta N_{i-1} - \Delta N_i|$ is smaller than zero, it means that the error tends to be increasing as indicated in FIG. 13B. In this instance, the motor torque $T_M$ is controlled in step SF8 so as to increase the input torque $T_I$ by a relatively large amount, that is, by an amount larger than that in step SP7. These techniques to control the motor torque $T_M$ correspond to a technique disclosed in JP-A-63-212137 for reducing the transient hydraulic pressure of coupling means when the speed at which a shifting action of the transmission takes place is higher than an optimum value.

Figure 13C:
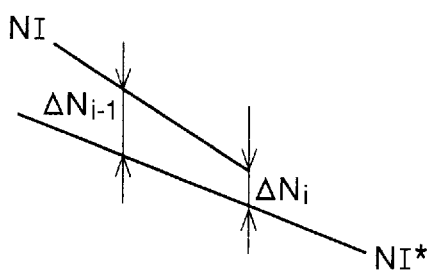
Figure 13D:
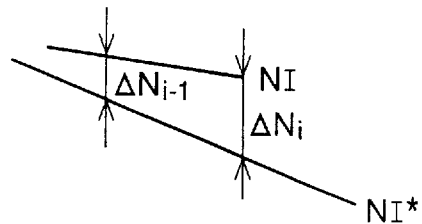

If a negative decision (NO) is obtained in step SF4, namely, if the detected input shaft speed $N_I$ is equal to or higher than the target value $N_I^*$, it means that the speed at which the shift-up action of the automatic transmission 18 is taking place is lower than the optimum value, or that the rate of change of the input shaft speed $N_I$ during the shift-up action is lower than the optimum value. This phenomenon occurs because the torque $T_I$ of the input shaft 26 of the automatic transmission 18 is larger than the optimum value, in relation to the engaging force or pressure of the coupling means to achieve the shift-up action. In this case, therefore, the motor torque $T_M$ is controlled so as to decrease the input torque $T_I$ of the automatic transmission 18. If an affirmative decision (YES) is obtained in step SF6, namely, if the error $|\Delta N_{i-1} - \Delta N_i|$ is equal to or larger than zero, it means that the error tends to be decreasing as indicated in FIG. 13C. In this instance, the motor torque $T_M$ is controlled in step SF9 so as to decrease the input torque $T_I$ by a relatively small amount. If a negative decision (NO) is obtained in step SF6, namely, if the error $|\Delta N_{i-1} - \Delta N_i|$ is smaller than zero, it means that the error tends to be increasing as indicated in FIG. 13D. In this instance, the motor torque $T_M$ is controlled in step SF10 so as to decrease the input torque $T_I$ by a relatively large amount, that is, by an amount larger than that in step SF9. These techniques to control the motor torque $T_M$ correspond to a technique disclosed in JP-A-63-212137 for increasing the transient hydraulic pressure of the coupling means when the speed at which the shifting action of the transmission takes place is lower than the optimum value.

In steps SF7 through SF10, the torque $T_M$ of the motor/generator 14 are increased or reduced when the hybrid drive system 10 is placed in the motor drive mode (operation mode 1) in which only the motor/generator 14 is operated as the drive power source, or in the engine-motor drive mode (operation mode 4) in which the engine 12 and the motor/generator 14 are both operated as the drive power source. In the engine drive mode (operation mode 2) in which only the engine 12 is operated as the drive power source while the motor/generator 14 is placed in the NON-LOAD or FREE state, the motor/generator 14 is controlled in steps SF7–SF10 so as to generate the reverse rotation torque $T_M$ or regenerative braking torque. In the engine drive+charging mode (operation mode 3) in which the motor/generator 14 is operated as the electric generator to generate an electric energy by regenerative braking, the regenerative braking torque is suitably controlled in steps SF7–SF10. The regenerative braking torque is considered to be one form of the motor torque $T_M$.

Steps SF3–SF10 of the motor torque feedback control sub-routine of FIG. 11 are repeatedly implemented at a predetermined cycle time until an affirmative decision (YES) is obtained in step SA10 of the transmission shift control routine of FIG. 10, whereby the torque $T_M$ of the motor/generator 14 is controlled so that a selected operating parameter of the automatic transmission 18 in the form of the input shaft speed $N_I$ of the automatic transmission 18 coincides with the target value $N_I^*$ determined from time to time in step SF3, that is, so that the input shaft speed $N_I$ changes according to a pattern of change of the target value $T_I^*$ determined by repeated implementation of step SF3.

It is noted that the control flow goes to step SA8 when the sub-routine of FIG. 11 is initiated, and step SA9 is implemented simultaneously with the sub-routine of FIG. 11, while an affirmative decision (YES) is obtained in step SA8, and until the affirmative decision (YES) is obtained in step SA10.

Since the sub-routine of FIG. 11 permits the motor torque $T_M$ to be controlled with high accuracy and response, the operating state (engaging or releasing action) of the coupling means for achieving the shift-up action of the automatic transmission 18 can be optimized with higher accuracy than in the prior art in which the pressure of the coupling means or the output of the engine 12 is controlled to control a shifting action of the transmission.

Further, the present arrangement to control the motor torque $T_M$ for optimizing a shifting action of the automatic transmission 18 is applicable to different hybrid drive systems which use the same automatic transmission 18 but the engine and motor/generator of which exhibit different output characteristics. Namely, the shifting time $t_s$ and the pattern of change of the target input shaft speed $N_I^*$ are suitably selected so as to meet the specific output characteristics of the engine and motor/generator of the particular hybrid drive system. Thus, the same type of automatic transmission 18 controlled by the present shift control apparatus can be used for the different hybrid drive systems.

Figure 14:
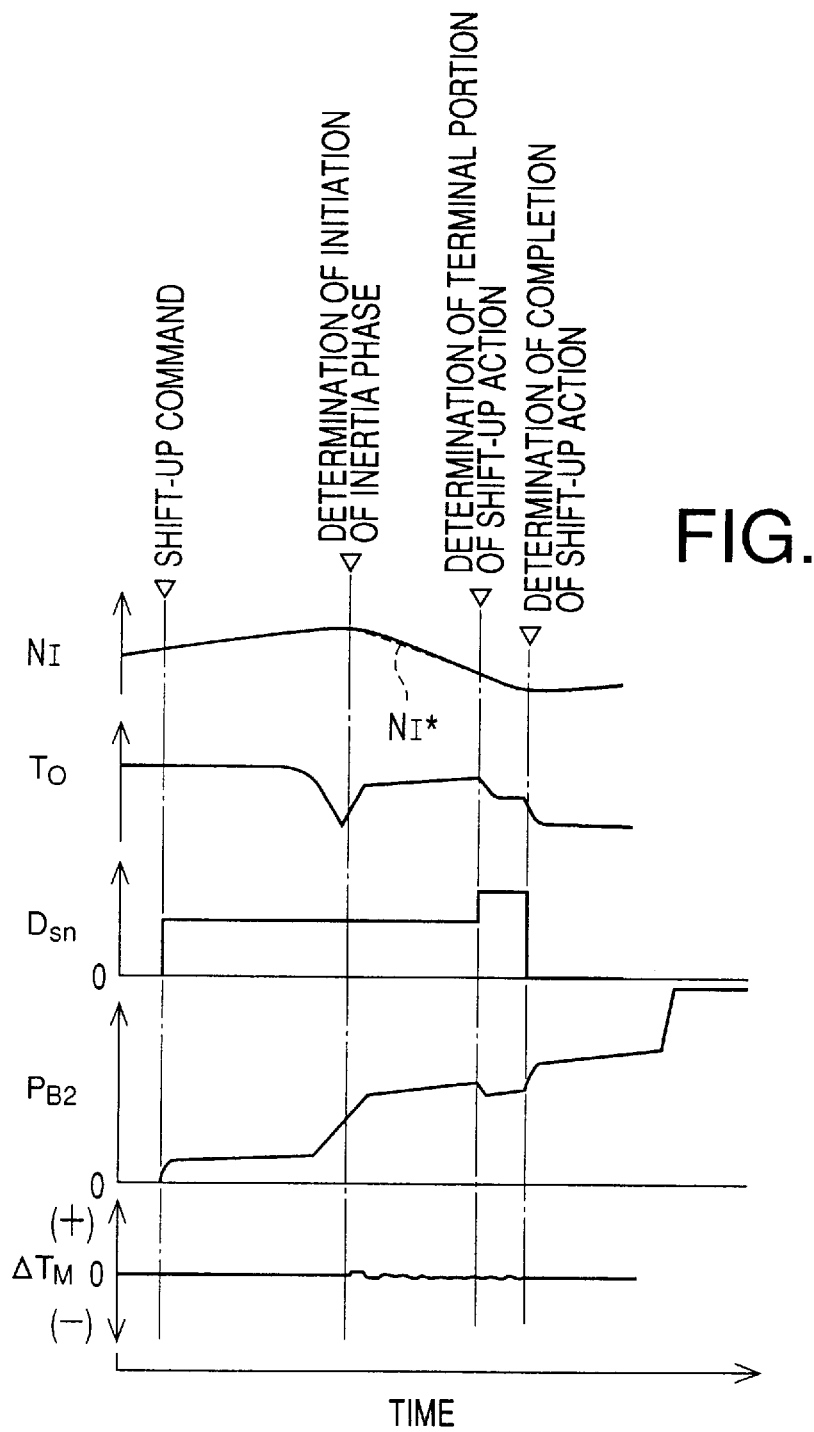
FIG. 14 is a time chart indicating an example of changes of various parameters when the automatic transmission is controlled according to the transmission shift control routine of FIG. 10.
Figure 15:
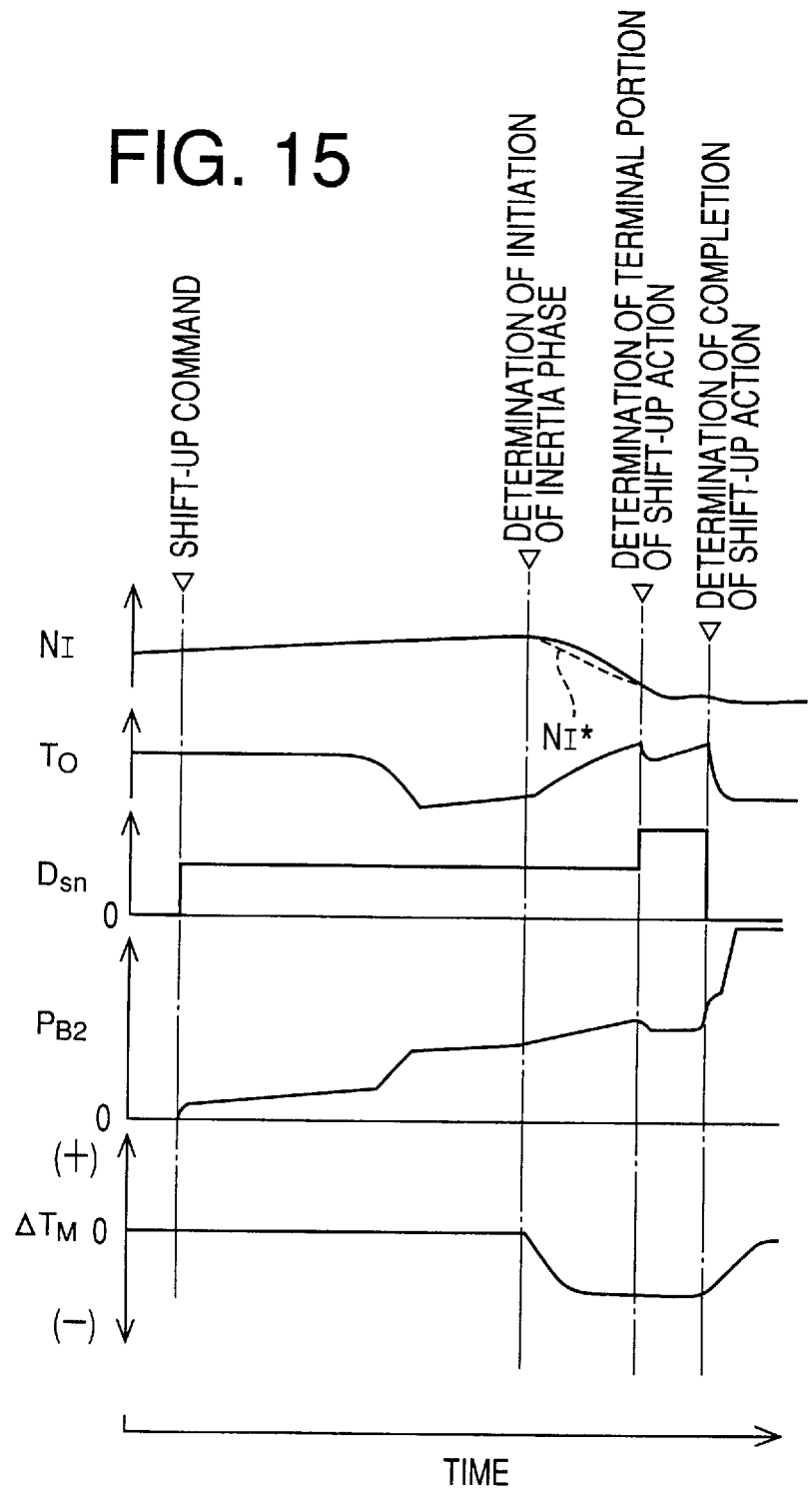
FIG. 15 is a time chart indicating another example of changes of the parameters when the automatic transmission is controlled according to the routine of FIG. 10.

Referring to the time charts of FIGS. 14 and 15, there are illustrated examples of changes of various parameters during the 2–3 shift-up action of the automatic transmission 18 in which the second brake B2 is brought to the engaged position. The parameters indicated in these figures are: speed $N_I$ of the input shaft 26; torque $T_O$ of the output shaft 19; duty ratio $D_{sn}$ of the linear solenoid valve SLN; engaging pressure PB2 of the second brake B2; and amount of compensation $\Delta T_M$ of the motor torque $T_M$ by the feedback control. In the example of FIG. 14, the actual input shaft speed $N_I$ follows the target value $N_I^*$ (indicated by broken line) with high accuracy, with the motor torque $T_M$ being changed by a relatively small amount $\Delta T_M$. Described in detail, the required amount of compensation of the motor torque $T_M$ during the feedback control according to the sub-routine of FIG. 11 is considerably small, provided the brake B2, accumulator 121 and engine 12 have the nominal specifications or output characteristics. In the example of FIG. 15, the initial engaging pressure PB2 of the brake B2 is relatively low, and the input shaft torque $T_I$ is decreased by decreasing the motor torque $T_M$ during the feedback control according to the sub-routine of FIG. 11. It is noted that the positive amount of compensation $\Delta T_M$ of the motor torque $T_M$ results in an increase in the input shaft torque $T_I$, while the negative amount of compensation $\Delta T_M$ results in a decrease in the input shaft torque $T_I$.

It will be understood that the motor torque feedback control sub-routine of FIG. 11 corresponds to the motor control means 140 shown in FIG. 9.

In the present embodiment, the ACCUMULATOR CONTROL pressure Pac is not controlled with the duty ratio $D_{sn}$ held at the initial value (determined in step SA3) until an affirmative decision (YES) is obtained in step SA8. However, the duty ratio $D_{sn}$ may be controlled to change according to a predetermined pattern. Further, the pattern of change of the target input shaft speed $N_I^*$ may be suitably selected. For instance, the target input shaft speed $N_I^*$ may be changed at comparatively low rates when the actual input shaft speed $N_I$ is close to the start and end values $N_{Ist}$, $N_{Iend}$. Further, the feedback control of the motor torque $T_M$ may be suitably modified. For instance, the amount of compensation $\Delta T_M$ of the motor torque $T_M$ during the feedback control may be varied as a function of the error $\Delta N_i$.

When the hybrid drive system 10 is placed in the motor drive mode (operation mode 1) in which the motor/generator 14 is controlled by the hybrid drive controller 50, this hybrid drive controller 50 is considered to serve as the motor control means 140. When the hybrid drive system 10 is placed in the engine drive mode (operation mode 2), engine drive+charging mode (operation mode 3) and engine-motor drive mode (operation mode 4), the motor/generator 14 is controlled by the motor control means 140.

Referring back to the flow chart of FIG. 10, the feedback control of the motor torque $T_M$ in step SA7 (sub-routine of FIG. 11) is followed by step SA8 to determine whether the shift-up action of the automatic transmission 18 has entered a terminal portion thereof. This determination is made to determine whether a terminal control of the duty ratio $D_{sn}$ should be initiated (whether step SA9 should be implemented). The determination in step SA8 is effected by determining whether the following inequality (5) is satisfied:

$$N_I < N_O \times i_H + \beta \qquad (5)$$

In the above inequality (5), "$i_H$" represents the speed ratio of the operating position (e.g., third-speed position "3rd") of the automatic transmission 18 established after the shift-up action is completed, and "$\beta$" represents a predetermined constant or a variable. The value "$\beta$" is desirably a variable which is changed on the basis of a suitable parameter such as the kind of the shift-up action or the input shaft torque $T_I$ of the automatic transmission 18, and according to a predetermined relationship between the above-indicated parameter and the value "$\beta$". This relationship may be represented by an equation or data map stored in a memory.

If an affirmative decision (YES) is obtained in step SA8, the control flow goes to step SA9 in which the duty ratio $D_{sn}$ during the terminal portion of the shift-up action is increased to a predetermined value, for example, to the maximum value, for reducing the engaging pressure of the coupling means to thereby reduce the torque transmitted through the coupling means, immediately before completion of engagement of the friction members of the coupling means, for the purpose of reducing the shifting shock of the automatic transmission 18. The value "β" in the above inequality (5) is suitably determined, for instance, by experiments, so as to effectively minimize the shifting shock or torque variation upon completion of the shift-up action of the automatic transmission. Step SA9 is repeatedly implemented until the affirmative decision (YES) is obtained step SA10, that is, until the shift-up action is completed. The determination in step SA10 is effected by determining whether the following inequality (6) is satisfied:

$$N_I < N_O \times i_H + \gamma \tag{6}$$

The value "γ" in the above inequality (6) is a constant which is close to zero and smaller than the value "β". This value "γ" is determined with the detecting error of the speeds $N_I$, $N_O$ taken into account.

If the affirmative decision (YES) is obtained in step SA10, the control flow goes to step SA11 to terminate the feedback control in the sub-routine of FIG. 11 (step SA7) and the terminal control of the duty ratio $D_{sn}$ in step SA9. In step SA11, the duty ratio $D_{sn}$ is zeroed.

In the present embodiment, the feedback control of the motor torque $T_M$ in step SA7 is terminated when the shift-up action is completed (when the affirmative decision is obtained in step SA10). However, the feedback control in step SA7 may be terminated when the terminal portion of the shift-up action is initiated (when the affirmative decision is obtained in step SA8).

Step SA11 is followed by steps SA12–SA17 for learning compensation of the duty ratio $D_{sn}$, more specifically, for leaning compensation of the data maps stored in the learning compensation data map memory means 144. The use of the duty ratio $D_{sn}$ determined according to the thus compensated or updated data maps is effective to optimize the engaging pressure of the coupling means in an initial portion of the shift-up action of the automatic transmission 18, that is, before the input and output shaft speeds $N_I$, $N_O$ have begun to change due to the initiation of the shift-up action, namely before the inertia phase of the automatic transmission 18 is initiated. After the inertial phase is initiated, dimensional and other variations of various components of the automatic transmission 18 during manufacture thereof and chronological changes of the automatic transmission 18 can be compensated for, by the feedback control of the motor torque $T_M$ in step SA7 described above. However, the feedback control of the motor torque $T_M$ cannot be effected before the inertia phase of the automatic transmission 18 is initiated with the shift-up action. In the absence of steps SA11–SA17, the initial engaging pressure of the coupling means may be excessively high or low due to the above-indicated variations and chronological change of the automatic transmission 18, leading to a possibility of abnormally early or late initiation of the inertia phase. For instance, the feedback control of the motor torque $T_M$ after the initiation of the inertia phase does not permit sufficient compensation of the motor torque $T_M$, making it impossible for the shift-up action to be completed within an interference period K of the accumulator 121 indicated in FIG. 16. In this case, the output shaft torque $T_O$ suddenly rises upon expiration of the interference period K, resulting in a considerably shifting shock of the automatic transmission 18. The time chart of FIG. 16 correspond to the time charts of FIGS. 14 and 15.

To deal with the above drawback, the initial engaging pressure of the coupling means is controlled in the present embodiment, by considering the various variations and chronological changes of the automatic transmission 18. Described more specifically, the initial engaging pressure is controlled by learning compensation of the stored data maps used for determining the initial duty ratio $D_{sn}$. This learning compensation of the data map is effected depending upon whether the adequate initial engaging pressure of the coupling means was obtained in the past, with the particular duty ratio $D_{sn}$ used during a particular shifting action of the automatic transmission 18 under a particular condition (e.g., selected operation mode of the hybrid drive system 10, kind of the shifting action, and input shaft torque $T_I$ as represented by the operating amount $\theta_{AC}$ of the accelerator pedal or throttle opening angle). The adequacy of the initial engaging pressure of the coupling means in the last control cycle can be evaluated on the basis of the manner in which the motor torque $T_M$ changes during the feedback control in the present control cycle.

The learning compensation of the data maps for determining the duty radio $D_{sn}$ is initiated with step SA12 to determine whether the average value of the amount of compensation $\Delta T_M$ of the motor torque $T_M$ during the feedback control in step SA7 is a positive value. If an affirmative decision (YES) is obtained in step SA12, the control flow goes to step SA13 to calculate the new duty ratio $D_{sn}$ according to the following equation (7):

$$D_{sn} = D_{sn} + \Delta T_{M1} \times k1 \tag{7}$$

If a negative decision (NO) is obtained in step SA12, that is, if the average value of the amount of compensation $\Delta T_M$ is a negative value, the control flow goes to step SA14 to calculate the new duty ratio $D_{sn}$ according to the following equation (8):

$$D_{sn} D_{sn} + \Delta T_{M2} \times k2 \tag{8}$$

"$\Delta T_{M1}$" in the above equation (7) represents the absolute value of a maximum value (positive value) of the amount of compensation $\Delta T_M$, while "$\Delta T_{M2}$" in the above equation (8) represents the absolute value of a minimum value (negative value) of the amount of compensation $\Delta T_M$. The values "k1" and "k2" in the equations (7) and (8) represent predetermined gains (between 0 and 1), for example, about 0.5.

Steps SA13 and SA14 are followed by step SA15 to determine whether the time $T_{si}$ (between the generation of the shift-up command and the initiation of the inertia phase) determined in step SA6 is equal to or longer than a predetermined threshold $T_{lim}$. This threshold $T_{lim}$ is determined depending upon the operating amount $\theta_{AC}$ of the accelerator pedal and the kind of the shift-up action (e.g., 2–3 shift-up action). For instance, the threshold $T_{lim}$ is the maximum time between the generation of the shift-up command the initiation of the inertia phase, which maximum time permits the shift-up action to be completed within the interference period K of the accumulator 121 indicated in FIG. 16. Where the time $T_{si}$ is shorter than the threshold $T_{lim}$, that is if a negative decision (NO) is obtained in step SA15, it means that the duty ratio $D_{sn}$ determined in step SA13 or SA14 can be used, in the next control cycle. In this case, therefore, the control flow goes to step SA17 in which the new duty ratio $D_{sn}$ determined in step SA13 or SA14 is stored in the learning compensation data map memory means 144. That is, the appropriate data map stored in the memory means 144 is updated in relation to the particular running condition of the vehicle (operation mode, kind of the shift-up action and input shaft torque $T_I$), so that the new duty ratio $D_{sn}$ is used in the next control cycle according to the updated data map if the same shift-up action takes place under the same condition. Where the time $T_{si}$ is not shorter than the threshold $T_{lim}$, that is, if an affirmative decision (YES) is obtained in step SA15, it means that the shift-up action cannot be completed within the interference period K of the accumulator 121. In this case, the control flow goes to step SA16 in which the new duty ratio $D_{sn}$ is calculated according to the following equation (9), by subtracting a predetermined value $D_{ST}$ from the duty ratio $D_{sn}$ calculated in step SA13 or SA14.

$$D_{sn}=D_{sn}D_{ST} \quad (9)$$

In step SA16, the appropriate data map stored in the memory means 144 is updated in relation to the particular running condition of the vehicle, so that the new duty ratio $D_{sn}$ is used in the next control cycle according to the updated data map if the same shift-up action takes place under the same condition.

Thus, the present embodiment is adapted to not only feedback control the motor torque $T_M$ in step SA7 (subroutine of FIG. 11) so that the actual input shaft speed $N_I$ of the automatic transmission 18 coincides with the target value $N_I^*$, but also update the data maps stored in the memory means 144 or compensate the duty ratio $D_{sn}$, as a result of the feedback control of the motor torque $T_M$, for adjusting the initial engaging pressure of the coupling means which is engaged to achieve the shift-up action in question. The learning compensation of the duty ratio $D_{sn}$ makes it possible to reduce the required amount of compensation $\Delta T_M$ of the motor torque $T_M$ during the feedback control in step SA7 after the initiation of the inertia phase. This arrangement permits improved adequacy of control of the shifting action of the automatic transmission 18. In this respect, it is noted that the pattern of change of the motor torque $T_M$ by the feedback control varies depending upon the amount of deviation of the initial engaging pressure of the coupling means from the optimum value. Where the initial engaging pressure of the coupling means is relatively low, as in the example of FIG. 15, the adjustment or control of the input shaft torque $T_I$ must be effected for a relatively long time in the absence of the learning compensation of the duty ratio $D_{sn}$. In the present embodiment, however, the duty ratio $D_{sn}$ is adjusted by learning compensation depending upon the manner in which the amount of compensation $\Delta T_M$ of the motor torque $T_M$ varies as a result of the feedback control. Accordingly, the required amount of compensation $\Delta T_M$ by the feedback control in step SA7 is significantly reduced by the learning compensation of the duty radio $D_{sn}$ (initial engaging pressure of the coupling means) in step SA11–SA17.

Figure 16:
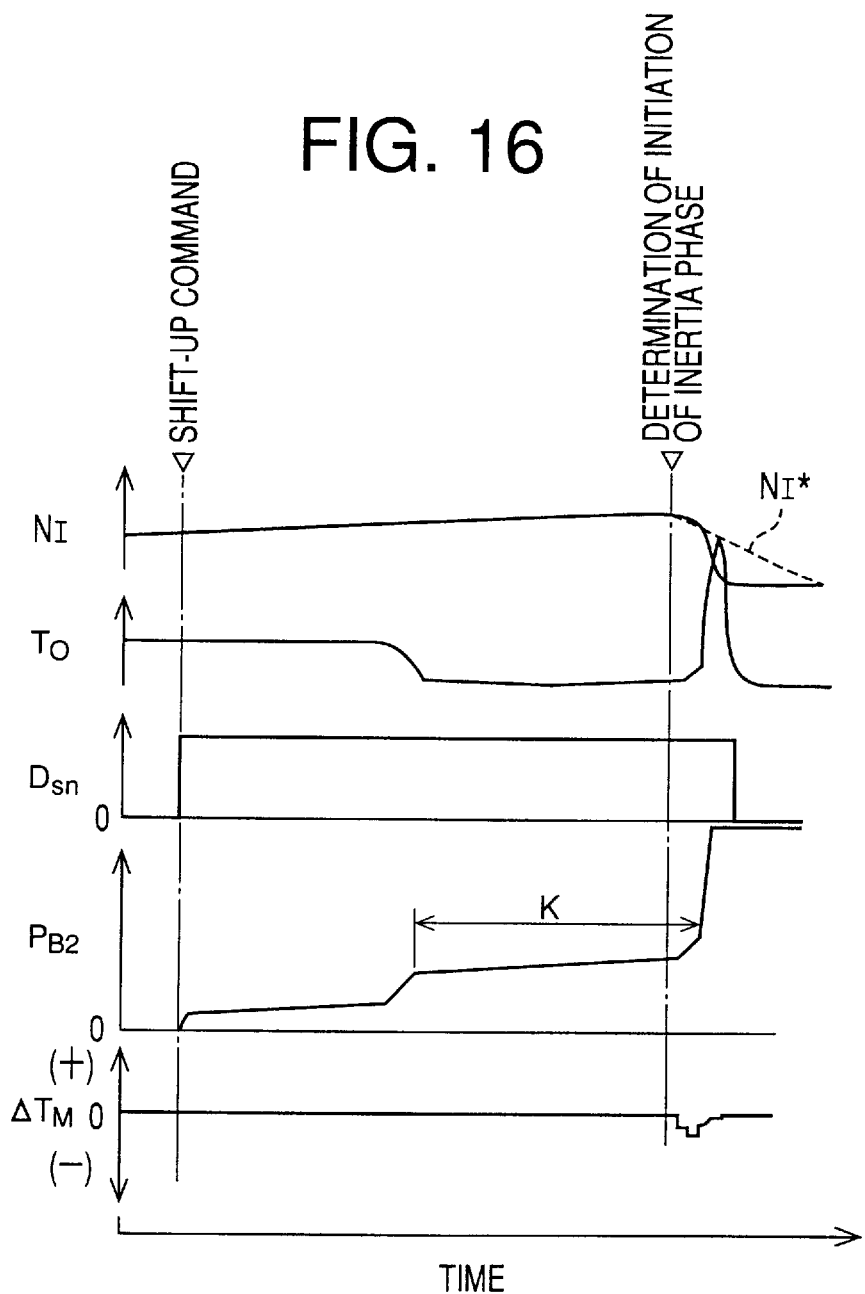
FIG. 16 is a time chart indicating an example of a drawback which may be encountered if learning compensation of duty ratio $D_{sn}$ of hydraulic control means 146 is not effected.

The present embodiment is adapted such that the duty ratio $D_{sn}$ is changed by the predetermined amount $D_{ST}$ if the time $T_{si}$ is not shorter than the threshold $T_{lim}$. This arrangement is effective to prevent abnormally late initiation of the inertia phase of the automatic transmission 18 due to an extremely low engaging pressure of the coupling means in the initial portion of the shifting action. The abnormal delay of the initiation of the inertia phase prevents the completion of the shifting action within the interference period K of the accumulator 121, after the initiation of the inertia phase, as in the case of FIG. 16. In this case, the pressure of the coupling means suddenly rises upon completion of the interference period K, and the automatic transmission 18 suffers from a considerable shifting shock. In the case of FIG. 16 in which the learning compensating of the duty ratio $D_{sn}$ is not effected, the period of the feedback control of the motor torque $T_M$ is relatively short, and the shifting action is completed before the motor torque $T_M$ is actually changed to an appreciable extent, whereby the adequacy of the initial engaging pressure of the coupling means cannot be accurately evaluated on the basis of the pattern of change of the motor torque $T_M$.

It will be understood that steps SA3, SA4 and SA12–SA17 correspond to the initial state control means 142 for controlling the operating state (e.g., engagement) of the coupling means (brake B2) on the basis of a result of the feedback control of the motor torque $T_M$ during a shifting action (e.g., 2–3 shift-up action) of the automatic transmission 18.

In the present embodiment of FIGS. 9–11, the result of the feedback control of the motor torque $T_M$ in a given shifting action of the automatic transmission 18 effected under a given vehicle running condition is used to change or update the appropriate data map for the duty ratio $D_{sn}$ stored in the memory means 144, that is, the data map which corresponds to the same shifting action effected under the same vehicle running conditions. The present embodiment is adapted to consider the currently selected operation mode of the hybrid drive system 10 and the input torque $T_I$ (as represented by the operating amount of the accelerator pedal, for example) in determining whether the memory means 144 stores the data map that should be updated. However, the other running conditions such as the point of time at which the shifting action takes place, and the temperature of the working fluid of the hydraulic control device 44 and automatic transmission 18. It is desirable that these other running conditions be be taken into account in determining whether the stored data maps should be updated or not. Further, it is possible to inhibit the learning compensation or updating of the data maps when the shifting action is effected immediately after the starting of the engine 12 or when the temperature of the working fluid is considerably low, since the result of the feedback control of the motor torque $T_M$ is not generally reliable under such conditions. It is also possible to use the results of the feedback control of the motor torque in two or more occurrences of the same shifting action of the automatic transmission 18. In this case, a weighted mean of the results in the two or more occurrences may be used for updating the data maps in the memory means 144 or for learning compensation of the duty ratio $D_{sn}$ or initial engaging pressure of the coupling means.

Steps SA13 and SA14 of the routine of FIG. 10 are formulated to calculate the new duty ratio values $D_{sn}$ by using the positive maximum and negative minimum values $\Delta T_{M1}$, $\Delta T_{M2}$ of the amount of compensation $\Delta T_M$ of the motor torque $T_M$, the mean value of the amount of compensation $\Delta T_M$ may be used in place of $\Delta T_{M1}$, $\Delta T_{M2}$.

Figure 17:
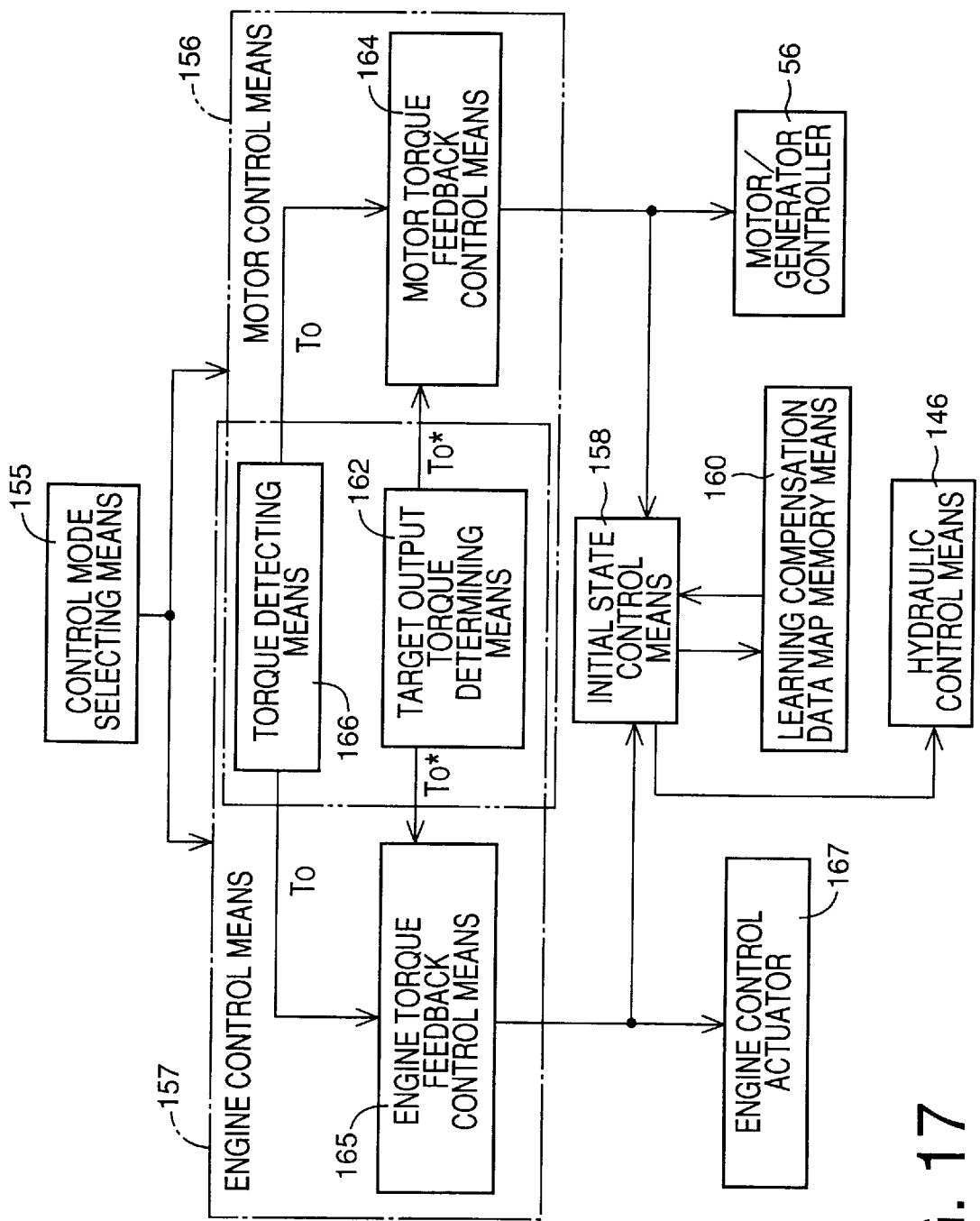
FIG. 17 is a block diagram for explaining the functions various functional means of a transmission shift control apparatus according to a second embodiment of this invention.
Figure 18:
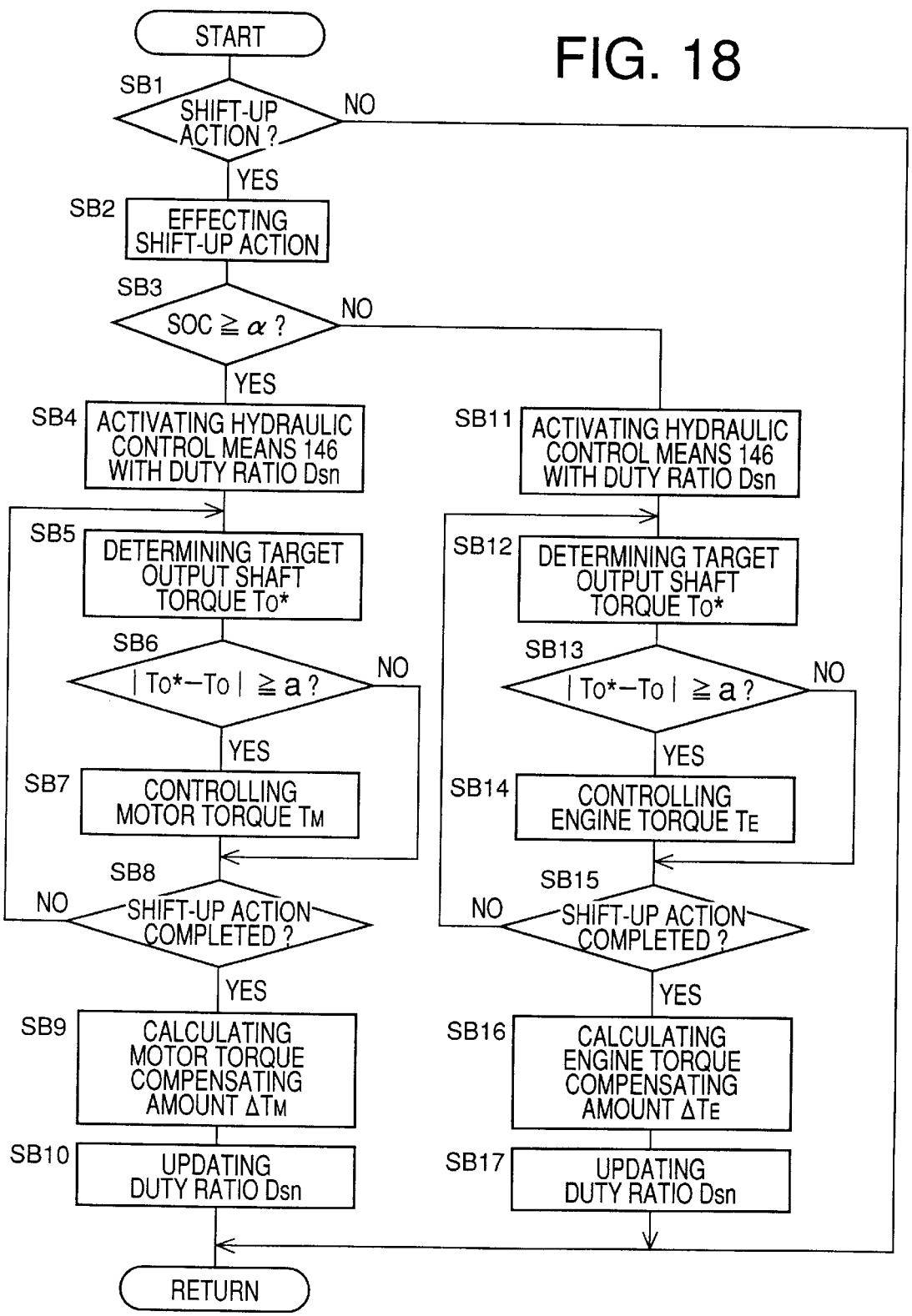
FIG. 18 is a flow chart illustrating a shift control routine executed by the shift control apparatus of FIG. 17.
Figure 19:
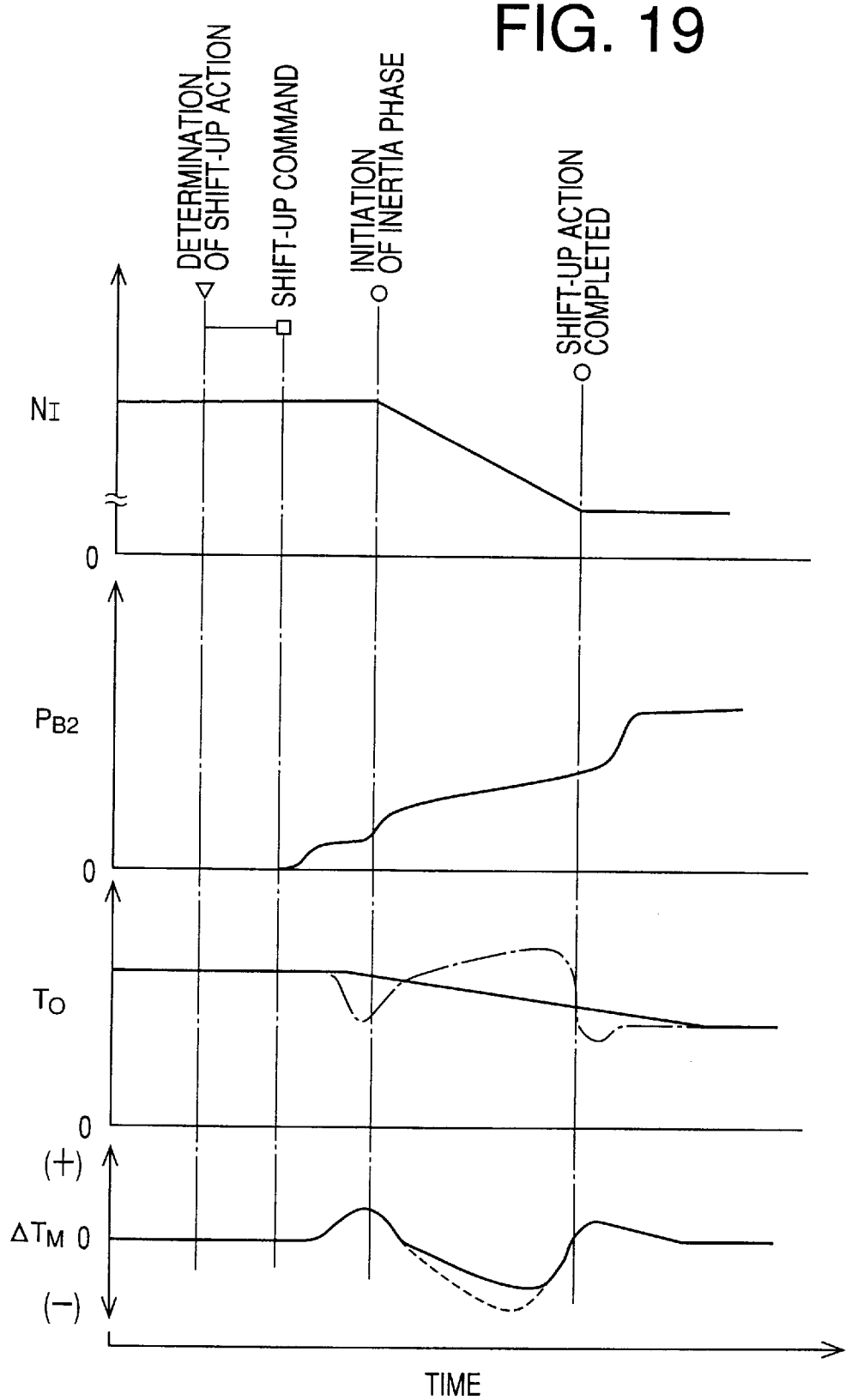
FIG. 19 is a time chart indicating an example of changes of various parameters when the automatic transmission is controlled according to the routine of FIG. 18.

Referring next to FIGS. 17–19, there will be described a second embodiment of this invention, which is identical in hardware with the first embodiment.

The shift control apparatus provided in the second embodiment includes control mode selecting means 155, motor control means 156, engine control means 157, engine control actuator 167, initial state control means 158, learning compensation data map memory means 160 and hydraulic control means 146, as shown in the block diagram of FIG. 17. The shift control apparatus is adapted to execute a transmission shift control routine illustrated in the flow chart of FIG. 18.

The motor control means 156 includes target output torque determining means 162, motor torque feedback control means 164, and torque detecting means 166. The torque detecting means 166 is adapted to directly or indirectly detect the torque $T_O$ of the output shaft 19 of the automatic transmission 18. The engine control means 157 includes the above-indicated target output torque determining means 162 and torque detecting means 166, and engine torque feedback control means 165. The engine control actuator 167, which is adapted to control the output of the engine 12, includes an actuator for controlling the throttle valve and an actuator for controlling the amount of injection of the fuel into the engine 12. The hybrid drive controller 50 and automatic transmission controller 52 cooperate to function as the initial state control means 156, target output torque determining means 162, motor torque feedback control means 164 and engine torque feedback control means 165.

It will be understood that step SB3 of the routine of FIG. 18 corresponds to the control mode selecting means 155, and steps SB3, SB9–SB11, SB16 and SB17 correspond to the initial state control means 158, while steps SB5–SB7 corresponds to the motor torque feedback control means 156. It will also be understood that steps SB12–SB14 corresponds to the engine control means 157. Step SB5 is implemented by the target output torque determining means 162 of the engine control means 156, while steps SB6 and SB7 are implemented by the motor torque feedback control means 164 of the motor control means 156. Further, step SB12 is implemented by the target output torque determining means 162 of the engine control means 157, while steps SB13 and SB14 are implemented by the engine torque feedback control means 165 of the engine control means 157.

The transmission shift control routine of FIG. 18 is initiated with step SB1 similar to step SA1 of the routine of FIG. 10. If an affirmative decision (YES) is obtained in step SB1, the control flow goes to step SB2 which is similar to step SA2 of the routine of FIG. 10. Step SB2 is followed by step SB3 to determine whether the amount of electric energy SOC stored in the electric energy storage device 58 is equal to or larger than a predetermined threshold α. The threshold α is a lower limit of the stored electric energy amount SOC above which the motor torque $T_M$ can be adequately controlled in steps SB5, SB6 and SB7. The threshold α may be the same as the lower limit A described above with respect to step step S12 of the routine of FIG. 7. If an affirmative decision (YES) is obtained in step SB3, the control flow goes to step SB4 and the following steps. If a negative decision (NO) is obtained in step SB3, the control flow goes to step SB11 and the following steps.

Step SB4 is provided to determine the duty ratio $D_{sn}$ according to the data maps stored in the learning compensation data map memory means 160, and activate the hydraulic control means 146 (linear solenoid valve SLN, SLU) with the determined duty ratio $D_{sn}$, as in steps SA3 and SA4 of the routine of FIG. 10, so that the initial engaging pressure of the coupling means in question is controlled. The data maps stored in the memory means 160 consist of a first group of data maps used in step SB4 followed by steps SB5–SB7 implemented by the motor control means 156, and a second group of data maps used in step SB11 followed by steps SB12–SB14 implemented by the engine control means 157. The data maps of each group correspond to respective combinations of the shifting action of the automatic transmission 14 and the vehicle running conditions such as the operation mode of the hybrid drive system 10 and the input shaft torque $T_I$.

In step SB5, a target value $T_O^*$ of the output shaft torque $T_O$ of the automatic transmission 18 is determined according to a predetermined equation or data map, depending upon the kind of the shift-up action, the vehicle speed V and the currently required output of the engine 10, for example. For instance, the target output shaft torque value $T_O^*$ is determined in step SB5 so that the actual output shaft torque $T_O$ is changed smoothly as indicated by solid line in FIG. 19, during and after the shift-up action. Step SB5 is followed by step SB6 to determine whether the absolute value of a difference or error of the actual output shaft torque $T_O$ from the target value $T_O^*$ is equal to or larger than a predetermined threshold "a". If the absolute value $|T_O^*-T_O|$ is equal to or larger than the threshold "a", the control flow goes to step SB7 in which the motor torque $T_M$ is controlled so as to reduce the error $|T_O^*-T_O|$. That is, if the error $T_O^*-T_O$ is larger than zero, it means that the output shaft torque $T_O$ is insufficient. In this case, therefore, the motor torque $T_M$ is controlled depending upon the error $T_O^*-T_O$, so as to increase the input shaft torque $T_I$ of the automatic transmission 18. If the error $T_O^*-T_O$ is smaller than zero, it means that the output shaft torque $T_O$ is excessively large. In this case, therefore, the motor torque $T_M$ is controlled depending upon the error $T_O^*-T_O$, so as to reduce the input shaft torque $T_I$. Then, the control flow goes to step SB8 to determine whether the shift-up action of the automatic transmission 18 is completed. This determination in step SB8 is effected in the same manner as in step SA10. The feedback control of the motor torque $T_M$ in steps SB5–SB7 is continued until the shift-up action is completed.

Thus, the present second embodiment is adapted to feedback control the motor torque $T_M$ so that a selected operating parameter of the automatic transmission 18 in the form of the actual output shaft torque $T_O$ changes so as to coincide with the target value $T_O^*$ which is determined from time to time, that is, so that the output shaft torque $T_O$ changes according a pattern of change of the target value $T_O^*$ determined by repeated implementation of step SB5. Since the torque $T_M$ of the motor/generator 14 can be controlled with high accuracy and response, the operating state of the coupling means for achieving the shift-up action of the automatic transmission 18 can be optimized with higher accuracy and a smaller degree of shifting shock (with a smaller amount of variation in the output shaft torque $T_O$), than in the prior art in which the pressure of the coupling means or the output of the engine 12 is controlled to control a shifting action of the transmission. In particular, the present embodiment is adapted to monitor the output shaft torque $T_O$ of the automatic transmission 18 which directly reflects a load on the power transmitting system and which closely relates to the shifting shock, and control the motor torque $T_M$ so that the actual output shaft torque $T_O$ coincides with the target value $T_O^*$. This arrangement assures improved adequacy of control of the shifting action.

The time chart of FIG. 19 shows an example of changes of the input shaft speed $N_I$, engaging pressure PB2 of the second brake B2, actual output shaft torque $T_O$, and amount of compensation $\Delta T_M$ of the motor torque $T_M$ by the feedback control in steps SB5–SB7, in the process of the 2–3 shift-up action of the automatic transmission 18 from the second-speed position "2nd" to the third-speed position "3rd". With the feedback control of the motor torque $T_M$, the actual output shaft torque $T_O$ is changed substantially following the target value $T_O^*$ which is determined from time to time.

It will be understood that steps SB5–SB7 corresponds to the motor control means 156 for controlling the torque $T_M$ of the motor/generator 14 during a shifting action of the automatic transmission 18, such that the output shaft torque $T_O$ changes according to the target value $T_O^*$.

The amount of compensation $\Delta T_M$ of the motor torque $T_M$ generally changes by a comparatively large amount, as indicated by solid line in FIG. 19. It is therefore difficult to feedback control the motor torque $T_M$ with high accuracy so that the output shaft torque $T_O$ accurately coincides with the target value $T_O^*$ In this sense, it is desirable that a feedforward control of the motor torque $T_M$ as well as the feedback control be effected so that the amount of compensation $\Delta T_M$ follows a desired pattern depending upon the kind of the shifting action of the automatic transmission 18, and the particular running condition of the vehicle (vehicle speed and engine output).

In the time chart of FIG. 19, one-dot chain line indicates a change in the output shaft torque $T_O$ where the motor torque $T_M$ is not controlled according to the present invention. IN this case, the output torque $T_O$ changes, depending upon the characteristic of the coupling means (brake B2) during the shifting action.

In the present second embodiment, too, the ACCUMULATOR CONTROL pressure Pac is not controlled with the duty ratio $D_{sn}$ held at the initial value, until the shifting action enters the terminal portion. However, the ACCUMULATOR CONTROL pressure Pac may be changed as needed. It is also noted that the manner of determining the target output shaft torque $T_O^*$ in step SB5 and the manner of feedback controlling the motor torque $T_M$ in steps SB5–SB7 may be suitably modified.

Referring back to the routine of FIG. 18, step SB7 is followed by step SB8 similar to step SA10. If an affirmative decision (YES) is obtained, the control flow goes to steps SB9 and SB10 for updating the data maps for the duty ratio $D_{sn}$, as in steps SA12–SA17 of the routine of FIG. 10 of the first embodiment. In the present second embodiment, however, the data maps are updated so that the duty ratio $D_{sn}$ is increased when the amount of compensation $\Delta T_M$ is larger a predetermined upper limit, and is decreased when the amount of compensation $\Delta T_M$ is smaller than a predetermined lower limit. In the time chart of FIG. 19, broken line indicates the amount of compensation $\Delta T_M$ which is a negative value smaller than the predetermined lower limit.

If a negative decision (NO) is obtained in step SB3, that is, if the stored electric energy amount SOC is smaller than the lower limit threshold $\alpha$, the control flow goes to step SB11 in which the duty ratio $D_{sn}$ is determined according to the data maps stored in the memory means 160, and the initial state control means 158 commands the hydraulic control means 146 to regulate the initial engaging pressure of the coupling means, according to the determined duty ratio $D_{sn}$. Step SB11 is followed by steps SB12 and SB12 identical to steps SB5 and SB6. If an affirmative decision (YES) is obtained in step SB13, the control means goes to step SB14 to control the torque $T_E$ of the engine 12 so as to reduce the error $|T_O^*-T_O|$. Described in detail, if the difference $T_O^*-T_O|$ is larger than zero, it means that the output shaft torque $T_O$ is smaller than an optimum value. In this case, the engine torque $T_E$ is increased by an amount corresponding to the error $|T_O^*-T_O|$. If the difference $T_O^*-T_O$ is smaller than zero, it means that the output shaft torque $T_O$ is larger than the optimum value. In this case, the engine torque $T_E$ is reduced by an amount corresponding to the error $|T_O^*-T_O|$. Step SB14 is followed by step SB15 identical with step SB8, to determine whether the shift-up action of the automatic transmission 18 is completed. Steps SB12, SB13 and SB14 are repeatedly implemented with a predetermined cycle time to effect the feedback control of the engine torque $T_E$ until the shift-up action is completed.

If an affirmative decision (YES) is obtained in step SB15, the control flow goes to steps SB16 and SB17 similar to steps SB9 and SB10, to calculate the motor torque compensating amount $\Delta T_M$ and update the data maps for the duty ratio $D_{sn}$.

As described above, the present second embodiment is adapted to control the engine torque $T_E$ when the electric energy amount SOC stored in the storage device 58 is insufficient, that is, when the torque $T_E$ of the motor/generator 14 cannot be controlled. Thus, the output shaft torque $T_O$ is controlled to coincide with the target value $T_O^*$ so as to minimize the shifting shock of the automatic transmission 18, even when the motor/generator 14 cannot be used as the drive power source.

Like the feedback control of the motor torque $T_M$ in steps SB5–SB7, the feedback control of the engine torque $T_E$ in steps SB12–14 is desirably effected together with a feedforward control with the compensating amount $\Delta T_E$ being changed following a desired pattern. In the present feedback control of the engine foregoing $T_E$, too, the ACCUMULATOR CONTROL pressure Pac is not controlled with the duty ratio $D_{sn}$ held at the initial value, until the shifting action enters the terminal portion. However, the ACCUMULATOR CONTROL pressure Pac may be changed as needed. The manner of determining the target output shaft torque $T_O^*$ in step SB12 and the manner of feedback controlling the engine torque $T_M$ in steps SB12–SB14 may be suitably modified.

Figure 20:
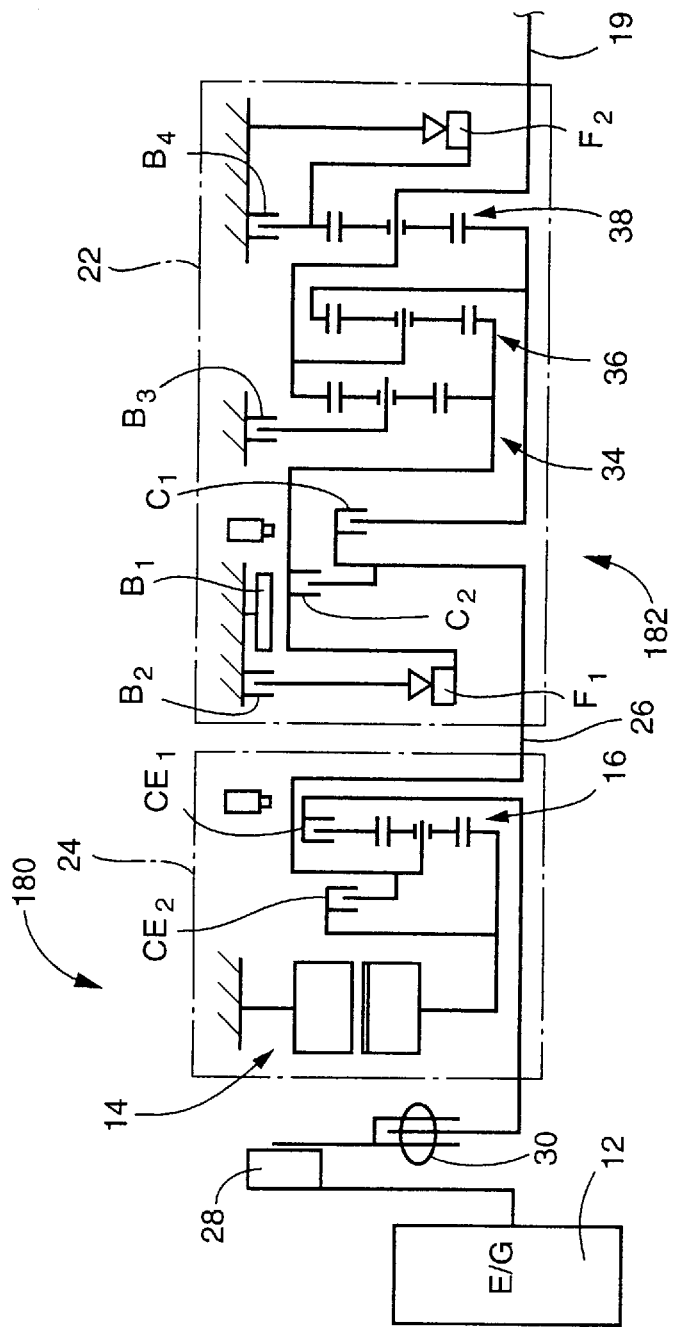
FIG. 20 is a schematic view showing a general arrangement of a hybrid drive system according to a third embodiment of the invention.

While the hybrid drive system 10 of FIG. 1 uses the automatic transmission 18 having one reverse-drive position and five forward-drive positions, the principle of the present invention is equally applicable to a hybrid drive system 180 using an automatic transmission 182 which does not include the auxiliary transmission 20 and employs only the primary transmission 22, as shown in FIG. 20. This automatic transmission 182 has one reverse-drive position and four forward-drive positions, as indicated in FIG. 21.

Although the present invention has been described above in its presently preferred embodiments by reference to the accompanying drawings, it is to be understood that the invention may be otherwise embodied.

While the transmission shift control routine of FIG. 10 is adapted to deal with the shift-up action (e.g., 2–3 shift-up action) of the automatic transmission 18, the principle of this invention is equally applicable to any shift-down actions of the automatic transmission 18.

The first embodiment of FIGS. 9–11 may be provided with engine control means as provided in the second embodiment of FIGS. 17 and 18, so that the engine torque $T_E$ is feedback controlled such that the input shaft speed $N_I$ of the transmission 18 coincides with the target value $N_I^*$, when the motor/generator 14 cannot be used as the drive power source due to an insufficient electric energy amount SOC stored in the storage device 58. Further, the engine control means provided in the second embodiment may be adapted to control the engine torque $T_E$ such that the input shaft speed $N_I$ coincides with the target value $N_I^*$, and the engine control means provided in the first embodiment may be adapted to control the engine torque $T_E$ such that the output shaft torque $T_O$ coincides with the target value $T_O^*$.

It is to be understood that the present invention may be embodied with various other changes, modifications and improvements, which may occur to those skilled in the art, in the light of the foregoing teaching.

What is claimed is:

1. A shift control apparatus for controlling an automatic transmission of a motor vehicle having a drive wheel, an engine operated by combustion of a fuel, and a motor/generator which function as at least one of an electric motor for driving said drive wheel and an electric generator, said automatic transmission having a variable speed ratio and being operatively connected to said drive wheel and an assembly of said engine and said motor/generator, said shift control apparatus comprising:

target determining means for determining a pattern of change of a target value of a selected operating parameter of said automatic transmission during a shifting action thereof; and motor torque feedback control means for feedback controlling a torque of said motor/generator during said shifting action of said automatic transmission such that said selected operating parameter changes according to said pattern of change of said target value.

2. A shift control apparatus according to claim 1, wherein said target determining means determines a pattern of change of a target value of a rotating speed of a rotary member of said automatic transmission, and said motor torque feedback control means controls the torque of said motor/generator such that the rotating speed of said rotary member changes according to the pattern of change of the target value of the rotating speed of said rotary member.

3. A shift control apparatus according to claim 2, wherein said automatic transmission has a plurality of operating positions having respective different speed ratios, and includes coupling means for selectively establishing said plurality of operating positions, said shift control apparatus further comprising:

initial state control means for controlling an initial operating characteristic of said coupling means during an initial portion of said shifting action of said automatic transmission, as a result of feedback control of said torque of said motor/generator by said motor torque feedback control means.

4. A shift control apparatus according to claim 3, wherein said initial state control means controls an initial engaging force of said coupling means during said initial portion of portion of said shifting action.

5. A shift control apparatus according to claim 3, further comprising data map memory means for storing a data map representative of a predetermined relationship between said initial operating characteristic of said coupling means and a running condition of said motor vehicle, said initial state control means determining said initial operating characteristic of said coupling means on the basis of said running condition of the motor vehicle and according to said predetermined relationship, said initial state control means updating said data map as the result of said feedback control of the torque of the motor/generator.

6. A shift control apparatus according to claim 2, further comprising speed detecting means for detecting an actual value of the rotating speed of said rotary member which changes during said shifting action of said automatic transmission, and wherein said motor torque feedback control means feedback controls the torque of said motor/ generator such that said actual value of the rotary speed of said rotary member detected by said speed detecting means coincides with said target value which is determined from time to time by said target determining means.

7. A shift control apparatus according to claim 2, further comprising engine control means for feedback controlling a torque of said engine during said shifting action of said automatic transmission such that the rotating speed of said rotary member changes according to a predetermined pattern of change of a target value of said rotating speed.

8. A shift control apparatus according to claim 2, further comprising engine control means for feedback controlling a torque of said engine during said shifting action of said automatic transmission such that an output torque of said automatic transmission changes according to a predetermined pattern of change of a target value of said output torque.

9. A shift control apparatus according to claim 1, wherein said target determining means determines a pattern of change of a target value of an output torque of said automatic transmission, and said motor torque feedback control means controls the torque of said motor/generator such that the output torque of said automatic transmission changes according to the pattern of change of the output torque of said automatic transmission.

10. A shift control apparatus according to claim 9, wherein said automatic transmission has a plurality of operating positions having respective different speed ratios, and includes coupling means for selectively establishing said plurality of operating positions, said shift control apparatus further comprising:

initial state control means for controlling an initial operating characteristic of said coupling means during an initial portion of said shifting action of said automatic transmission, as a result of feedback control of said torque of said motor/generator by said motor torque feedback control means.

11. A shift control apparatus according to claim 10, wherein said initial state control means controls an initial engaging force of said coupling means during said initial portion of portion of said shifting action.

12. A shift control apparatus according to claim 10, further comprising data map memory means for storing a data map representative of a predetermined relationship between said initial operating characteristic of said coupling means and a running condition of said motor vehicle, said initial state control means determining said initial operating characteristic of said coupling means on the basis of said running condition of the motor vehicle and according to said predetermined relationship, said initial state control means updating said data map as the result of said feedback control of the torque of the motor/generator.

13. A shift control apparatus according to claim 9, further comprising torque detecting means for detecting an actual value of the output torque of said automatic transmission which changes during said shifting action of said automatic transmission, and wherein said motor torque feedback control means feedback controls the torque of said motor/ generator such that said actual value of the output torque of said automatic transmission detected by said torque detecting means coincides with said target value which is determined from time to time by said target determining means.

14. A shift control apparatus according to claim 9, further comprising engine control means for feedback controlling a torque of said engine during said shifting action of said automatic transmission such that a rotating speed of a rotary member of said automatic transmission changes according to a predetermined pattern of change of a target value of said rotating speed.

15. A shift control apparatus according to claim 9, further comprising engine control means for feedback controlling a torque of said engine during said shifting action of said automatic transmission such that the output torque of said automatic transmission changes according to a predetermined pattern of change of a target value of said output torque.

16. A shift control apparatus according to claim 1, wherein said automatic transmission has a plurality of operating positions having respective different speed ratios, and said shifting action of said automatic transmission is a shift-up action from one of said operating positions to another of said operating positions whose speed ratio is lower than that of said one of said operating positions, said speed ratios being ratios of an input speed to an output speed of said automatic transmission.

17. A shift control apparatus according to claim 1, wherein said motor vehicle is a hybrid drive motor vehicle wherein at least one of said engine and said motor/generator is selectively operated as a drive power source for driving said drive wheel in a selected one of a plurality of operation modes.

* * * * *